(12) United States Patent
Maeda et al.

(10) Patent No.: US 10,268,398 B2
(45) Date of Patent: Apr. 23, 2019

(54) STORAGE SYSTEM, RECORDING MEDIUM FOR STORING CONTROL PROGRAM AND CONTROL METHOD FOR STORAGE SYSTEM

(71) Applicant: FUJITSU LIMITED, Kawasaki-shi, Kanagawa (JP)

(72) Inventors: Munenori Maeda, Yokohama (JP); Toshihiro Ozawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 813 days.

(21) Appl. No.: 14/844,483

(22) Filed: Sep. 3, 2015

(65) Prior Publication Data
US 2015/0378619 A1    Dec. 31, 2015

Related U.S. Application Data

(63) Continuation of application No. PCT/JP2014/058471, filed on Mar. 26, 2014.

(30) Foreign Application Priority Data

Mar. 29, 2013  (JP) .................................. 2013-074802

(51) Int. Cl.
*G06F 17/30*   (2006.01)
*G06F 3/06*    (2006.01)

(52) U.S. Cl.
CPC ............ *G06F 3/0613* (2013.01); *G06F 3/061* (2013.01); *G06F 3/064* (2013.01); *G06F 3/0635* (2013.01);
(Continued)

(58) Field of Classification Search
CPC ......... G06F 17/30551; G06F 17/30864; G06F 17/30554; G06F 17/30424
See application file for complete search history.

(56) References Cited

U.S. PATENT DOCUMENTS 5,222,235 A * 6/1993 Hintz ................ G06F 17/30312
5,548,737 A * 8/1996 Edrington ............. G06F 9/5027
                                                              712/200
(Continued)

FOREIGN PATENT DOCUMENTS

JP    2001-148832    5/2001
JP    2003-134435    5/2003
(Continued)

OTHER PUBLICATIONS

International Search Report and Written Opinion of the International Searching Authority (Form PCT/ISA/210, Form PCT/ISA/237), mailed in connection with PCT/JP2014/058417 and dated Jun. 17, 2014, with English translation (6 pages).

*Primary Examiner* — Amanda L Willis
(74) *Attorney, Agent, or Firm* — Fujitsu Patent Center

(57) ABSTRACT

A storage system includes a storage device that stores divided data which represents data which is obtained by division of data in a time series; a server device that acquires a first time, searches interval-related information for an interval that overlaps an interval between the first time and a second time following the first time by a specified duration of time, the interval-related information storing information in which identifying information that identifies the divided data and information that relates to intervals which indicate start times and end times of the divided data are associated, and acquires identifying information for the divided data that corresponds to the interval for which the search was performed; and a terminal device that acquires from the storage device the divided data that corresponds to the acquired identifying information and reads out the acquired divided data in chronological order.

7 Claims, 22 Drawing Sheets

(52) U.S. Cl.
CPC ......... *G06F 3/0658* (2013.01); *G06F 3/0689* (2013.01); *G06F 17/30064* (2013.01); *G06F 17/30194* (2013.01); *G06F 17/30864* (2013.01)

(56) References Cited

U.S. PATENT DOCUMENTS

| | | | |
|---|---|---|---|
| 2002/0083195 A1* | 6/2002 | Beshai | H04L 12/5692 709/238 |
| 2003/0093810 A1 | 5/2003 | Taniguchi | |
| 2006/0064424 A1 | 3/2006 | Heuer et al. | |
| 2007/0276953 A1 | 11/2007 | Takeuchi et al. | |
| 2010/0306495 A1 | 12/2010 | Kumano et al. | |
| 2012/0330931 A1* | 12/2012 | Nakano | G05B 23/0283 707/722 |

FOREIGN PATENT DOCUMENTS

| | | |
|---|---|---|
| JP | 2006-515450 | 5/2006 |
| JP | 2007-288299 | 11/2007 |
| JP | 2010-277289 | 12/2010 |
| WO | 2004/047304 | 6/2004 |

* cited by examiner

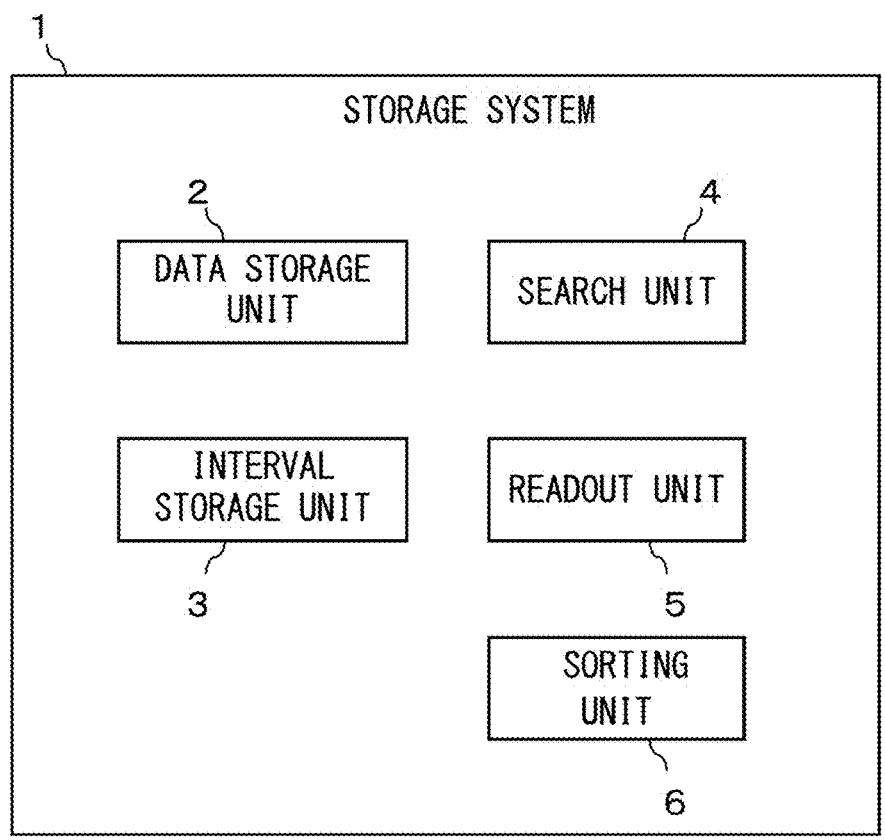
F I G. 1

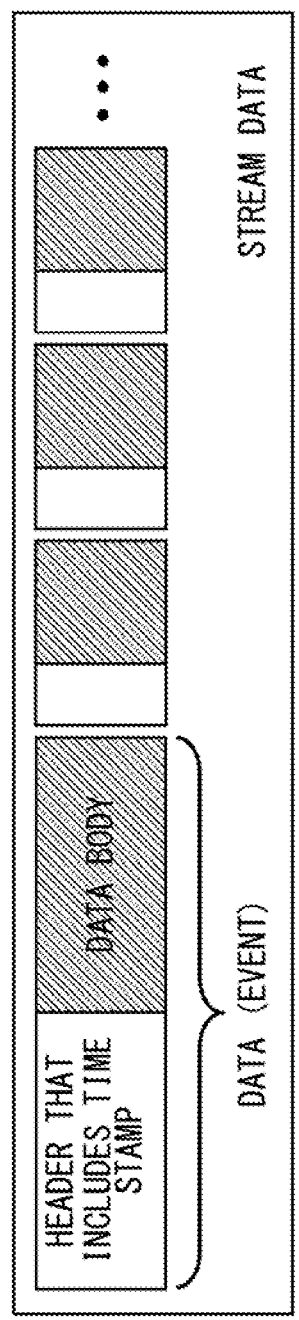
F I G. 2

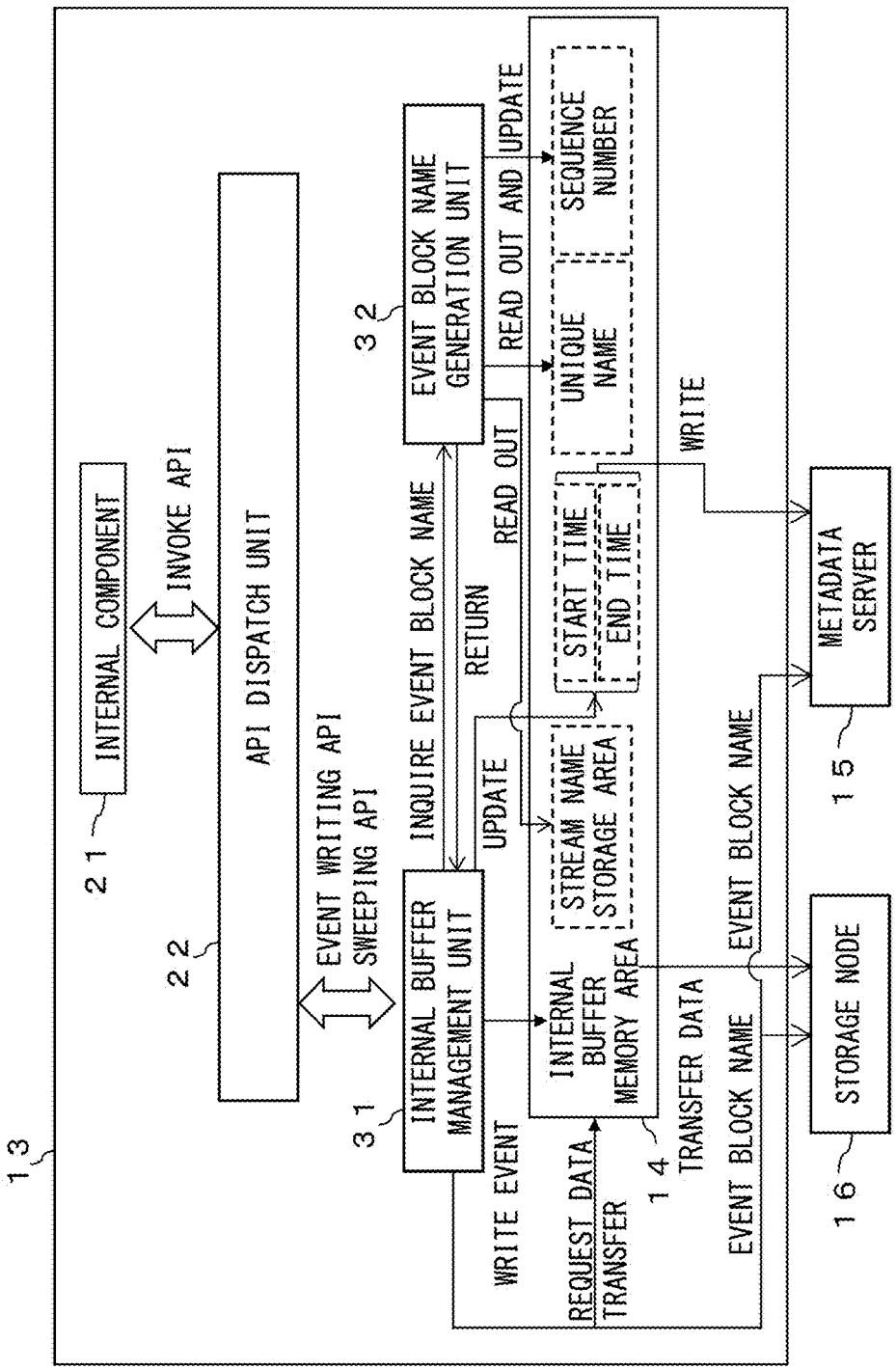
F I G. 5

F I G. 7

| RECORD NUMBER | START TIME (KEY) | END TIME | EVENT BLOCK NAME | DATA STRUCTURE FOR MANAGEMENT |
|---|---|---|---|---|
| 44-1 | 44-2 | 44-3 | 44-4 | 44-5 |
| ... | ... | ... | ... | ... |

44

/ 61

| |
|---|
| TIME KEY |
| DELAY CONDITION FLAG |
| ARRAY INDEX IN EVENT BLOCK |
| EVENT BLOCK |

F I G. 1 3

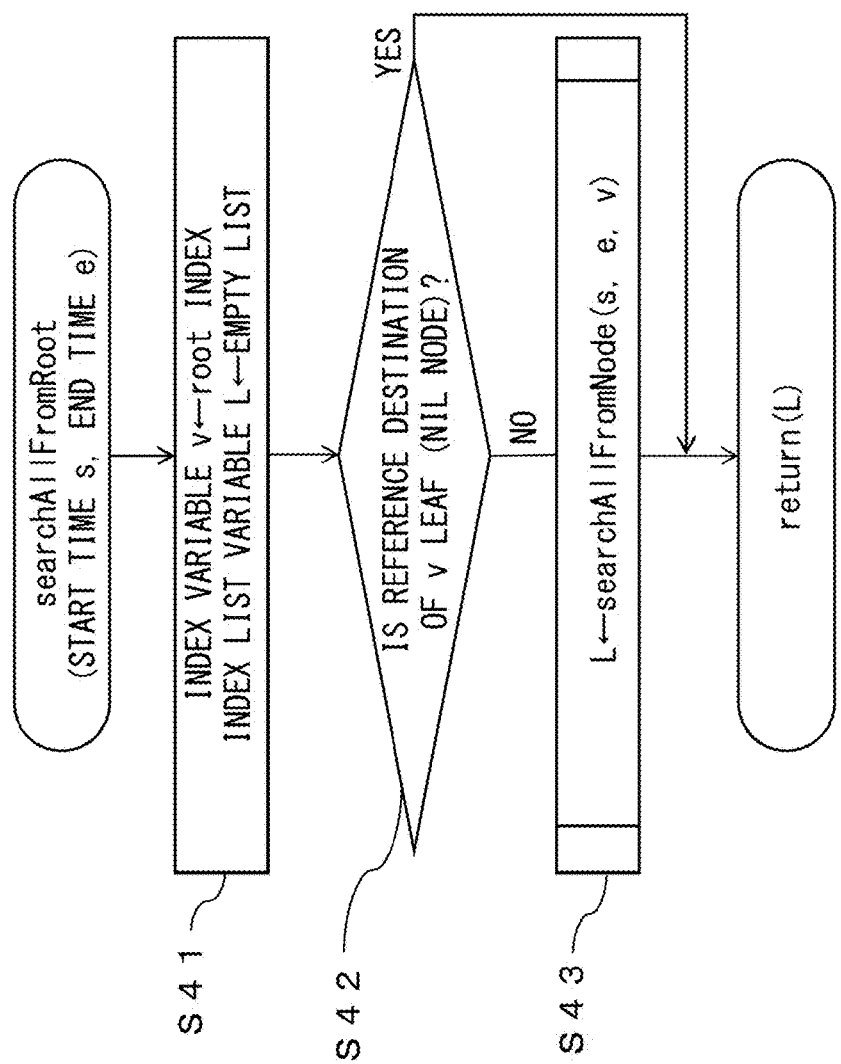
F I G. 16

STORAGE SYSTEM, RECORDING MEDIUM FOR STORING CONTROL PROGRAM AND CONTROL METHOD FOR STORAGE SYSTEM

CROSS-REFERENCE TO RELATED APPLICATION

This application is a continuation application of International Application PCT/JP2014/058417, filed on Mar. 26, 2014 and designated the U.S., which is based upon and claims the benefit of priority of the prior Japanese Patent Application No. 2013-074802, filed on Mar. 29, 2013, the entire contents of each of which are incorporated herein by reference.

FIELD

The embodiments discussed herein are related to a storage system, a recording medium for storing a control program, and a storage system.

BACKGROUND

A market for RTAP (Real Time Analytical Processing) that is targeted at sensor information and various logs is expanding, and therefore effective accumulation and use of input data in a time series is important. In a case in which an information collection and analysis service of data in a time series is performed on cloud, inputs from a large number of sensors and inputs of a large number of logs are combined, an enormous number of data rows are accumulated, and the entirety of data or a partial series is reproduced as necessary.

An example of a technique for simultaneously recording each piece of information that has been collected or simultaneously reproducing each piece of information that has been recorded in the above manner is a recording and reproducing device that operates n (n is a natural number greater than or equal to 2) recording devices in parallel and performs simultaneous recording and reproduction of m channels (m is a natural number greater than or equal to 2 and less than or equal to n). The recording and reproducing device separates stream data of m channels, divides the stream data into blocks in units of k (k is a natural number greater than or equal to m and less than or equal to n) images, assigns divided blocks of each channel to n storage devices and records the blocks in order.

Patent Document 1: Japanese Laid-open Patent Publication No. 2001-148832

SUMMARY

A storage system according to an aspect of the embodiments includes a storage device, a service device, and a terminal device. The storage device stores divided data that represents data which is obtained by division of data in a time series. The server device acquires a first time, searches interval-related information for an interval that overlaps an interval between the first time and a second time following the first time by a specified duration of time, the interval-related information storing information in which identifying information that identifies the divided data and information that relates to intervals that indicate start times and end times of the divided data are associated, and acquires identifying information for the divided data that corresponds to the interval for which the search was performed. The terminal device acquires the divided data that corresponds to the acquired identifying information from the storage device, and reads out the acquired divided data in chronological order.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates an example of a storage system according to an embodiment.

FIG. 2 illustrates an example of stream data according to the embodiment.

FIG. 5 is a block diagram relating to a writing and sweeping process of the storage proxy according to the embodiment.

FIG. 7 illustrates an example of an interval management table according to the embodiment.

FIG. 13 illustrates an example of a merge-tree node structure according to the embodiment.

FIG. 16 illustrates an example of a metadata-server interval-search process flow according to the embodiment.

DESCRIPTION OF EMBODIMENTS

Figure 3:
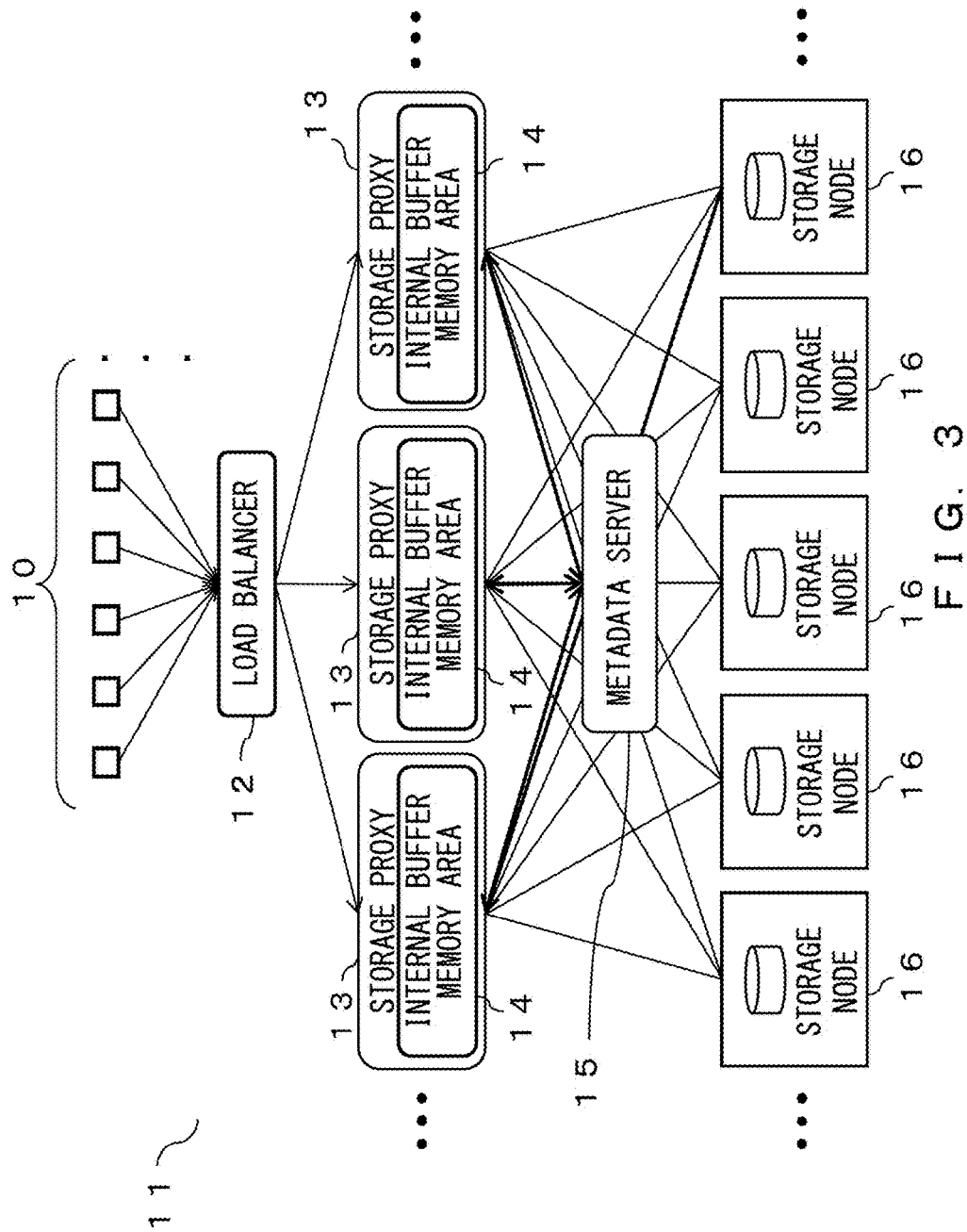
FIG. 3 illustrates an example of a stream storage system relating to an accumulation of stream data according to the embodiment.

It has been described that in the above recording and reproducing device, data that constitutes a stream is divided into n pieces and n pieces of data are recorded in n recording units, respectively. However, it is unclear specifically how the data is divided. In addition, the difference is not distinct between the recording and reproducing device and a disk array technology, especially RAID-0 (striping), which combines a plurality of disks and uses the disks as one virtual disk. Furthermore, in the recording and reproducing device, speeding-up of a divided-data readout is not considered.

In one aspect, embodiments provide a technology for speeding up reading out of data in a time series that is stored in a storage unit.

For a storage that is intended for RTAP, an in-memory database or a column-oriented DB (database) is used. Especially, the column-oriented DB is sometimes used for high-speed reproduction of a data stream by taking advantage of the fact that the column-oriented DB can perform a high-speed readout by reading out the column of focused-on data. However, there is not so far a storage product that is specialized for a stream process such as reproducing at a high speed the entirety of a large quantity of accumulated data.

In a data stream process execution environment, it is possible to perform a process at parallelism that fits available resources of the moment in view of utilization at an environment such as cloud in which a hardware volume to be used may be changed on-demand. In order to utilize the above characteristics, it is preferable to be able to accumulate and reproduce accumulated data at parallelism that fits resources of the moment.

Stream data is a data row in which pieces of data are temporally arranged in a row. In order to store the temporal order, in a case in which additional writing to a file is performed, writing is sequential and a storage writing performance is limited. RAID (Redundant Arrays of Inexpensive Disks) technology that combines a plurality of (n) disks and uses the disks realizes an n-fold writing speed of that of a single disk. However, it is not possible to dynamically change the necessary resource amount (for example, a disk volume) by changing the flow rate of stream data.

In a case in which the flow rate of stream data has increased, it is possible to increase the number of servers that serve as receivers at a load balancer. Therefore, in the case of combining servers with a load balancer, it is preferable for stream data to be appropriately accumulated even in a case in which data receivers are separate servers. In addition, as a technology that is paired with an accumulation technology, a data reconstruction technology according to accumulation form is preferable.

In addition, collectively arranging all the pieces of data on a memory in order of stream would require enormous system resources (memory, CPU power), and thus such a method would not be practical. Therefore, it is preferable to output data under realistic system resources by incrementally reconstructing data that constitutes part of a stream and arraying the pieces of data.

It is also preferable to perform at a high speed a process for incrementally reconstructing and arraying data that constitutes part of the stream.

In view of the above, the embodiment provides a storage system that enables speeding-up of reading out of data in a time series that is stored in the storage unit.

FIG. 1 illustrates an example of the storage system according to the embodiment. The storage system 1 includes a data storage unit 2, an interval storage unit 3, a search unit 4, and a readout unit 5.

The data storage unit 2 stores divided data that represents data that is obtained by division of data in a time series. An example of the data storage unit 2 is a storage node 16.

The interval storage unit 3 stores information in which identifying information that identifies divided data is associated with information that relates to intervals that indicate start times and end times of the divided data. An example of the interval storage unit 3 is an interval management table 44.

The search unit 4 acquires a first time, searches the interval storage unit 3 for an interval that overlaps an interval between the first time and a second time that is a time a specified duration of time after the first time, and acquires identifying information for the divided data that corresponds to the interval for which the search has been performed. An example of the search unit 4 is a metadata server 15.

The readout unit 5 acquires the divided data that corresponds to the acquired identifying information from the data storage unit 2, and reads out the acquired divided data in chronological order. An example of the readout unit 5 is a terminal device such as a reproduction client 50.

Due to the configuration described above, it is possible to speed up reading out of data in a time series that is stored in the storage unit.

The search unit 4 acquires the earliest start time from among start times of divided data that is not included in the overlapping interval and that comes after the second time and before an end time, and performs the following search by using the acquired start time.

The configuration described above enables parallel processing.

The readout unit 5 reads out divided data that is specified by means of identifying information that corresponds to the earliest start time among start times of divided data that has been acquired from the data storage unit 2.

The configuration described above enables a readout of divided data in order of start time from the earliest.

The storage system 1 further includes a sorting unit that sorts data in a time series by using a load balancing algorithm. An example of the sorting unit is a load balancer 12. The configuration described above enables stream data of a large flow rate to be stored in a dispersed manner in parallel. Therefore, it is possible to speed up a stream-data accumulation process.

In an example of the embodiment, the following structure is assumed in order to deal with a stream of a large flow rate.

There is a load balancer and the load balancer distributes stream data to a plurality of destination nodes.

The distributed stream data has at least one time stamp attached from among time stamps of a transmission time of a transmission source, a reception time of the load balancer, a transmission time, and a reception time at a destination node. In the embodiment, a distributed object storage whose capacity and performance may be freely expanded and contracted is used.

FIG. 2 illustrates an example of stream data according to the embodiment. The stream data is data in a time series that is divided at specified time intervals. Each piece of divided data (event) includes a header that includes a time stamp and a body of data. Note that an event serial number may be used in place of the time stamp. Information for identifying a stream (stream name) is given to the stream data.

FIG. 3 illustrates an example of a stream storage system relating to an accumulation of stream data according to the embodiment. The stream storage system 11 includes the load balancer 12, storage proxies 13, a metadata server 15, and storage nodes 16.

A client 10 is a device such as a sensor. The client 10 is connected to the load balancer 12 via a communication network such as the Internet. The load balancer 12 is connected to each storage proxy 13 so that they can communicate with each other. Each storage proxy 13 is connected to the metadata server 15 so that they can communicate with each other. Each storage proxy 13 is connected to each storage node 16 so that they can to communicate with each other.

The load balancer 12 distributes to storage proxies 13 access requests from the clients 10 by using the load balancing algorithm while showing a single URL (Uniform Resource Locator) to the clients 10. In a case in which there is only one node of the storage proxy 13 or the clients 10 equally access the storage proxies 13, the load balancer 12 may be omitted. As the load balancing algorithm, a round robin method, a minimum connection method, and a fastest response method, etc. may be used.

The storage node 16 is an information processing device that corresponds to an object server that constitutes the distributed object storage. The storage proxy 13 is a thread, a process or an information processing device that corresponds to the proxy server that constitutes the distributed object storage. As the distributed object storage, for example, Amazon 53 (Amazon Simple Storage Service) and OpenStack Swift are well known.

The storage proxy 13 has an internal buffer memory area 14 that temporarily retains a specified volume of data (event) that has been transmitted from the client 10. The storage proxy 13 receives a request from the client 10 and returns a reply to the request. In addition, the storage proxy 13 retains in a storage device a table in which data that has been transmitted from the client 10 is associated with a storage node 16 for storing the data. There may be one or more storage proxies 13 for one stream.

The metadata server 15 has a function for absorbing a dynamic increase and decrease in the number of storage proxies 13 in recording, and a function for reproducing stream data by specifying a time.

The storage node 16 is an information processing device that has an area for storing data.

Figure 4:
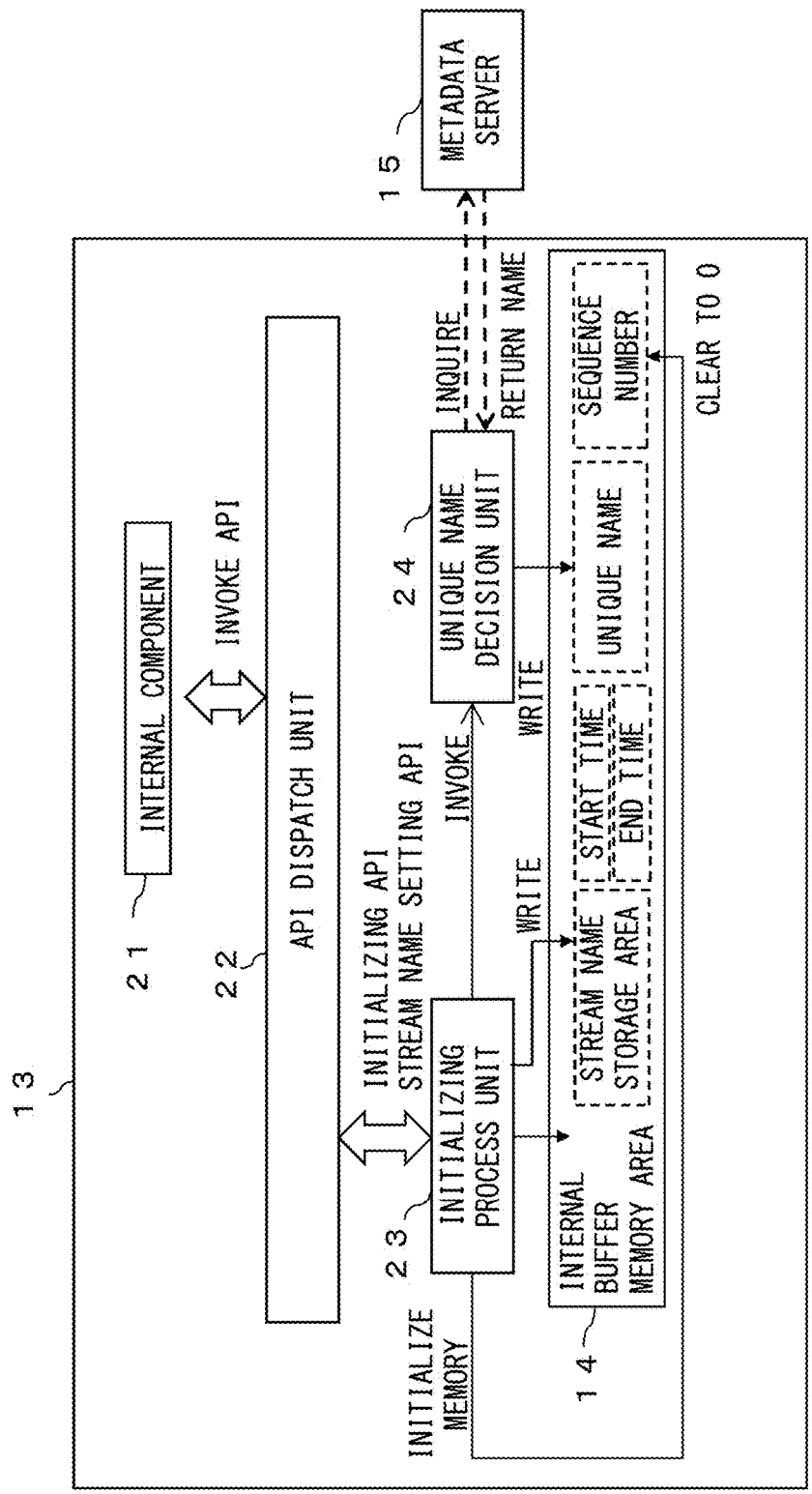
FIG. 4 is a block diagram relating to an initializing process of a storage proxy according to the embodiment.

FIG. 4 is a block diagram relating to an initializing process of the storage proxy according to the embodiment. There may be one or a plurality of storage proxies 13 for one stream. Each storage proxy 13 includes an internal component 21, an API (Application Program Interface) dispatch unit 22, an initializing process unit 23, and a unique name determination unit 24. The internal component 21, the API (Application Program Interface) dispatch unit 22, the initializing process unit 23, and the unique name determination unit 24 perform the following processes for each storage proxy 13.

The API dispatch unit 22 manages various APIs that the storage proxy 13 has and invokes the API upon request or at a specified timing, etc. The internal component 21 is a component that is on a higher-level middleware side and that runs on the storage proxy 13. The internal component 21 invokes an appropriate API upon initializing a storage and recording and reproducing a stream.

The initializing process unit 23 initializes for each stream an area which temporarily retains an event from among the internal buffer memory area 14 due to the fact that the initialing API was invoked for each stream by the API dispatch unit 22.

When the internal buffer management unit 31 is invoked by a stream name setting API, the internal buffer management unit 31 reads out the stream name of the stream in question from the received stream data, and sets the stream name in a stream name storage area in the internal buffer memory area 14.

The initializing process unit 23 initializes a start time and an end time that are stored in the internal buffer memory area 14. In addition, the initializing process unit 23 initializes to "0" the serial number (sequence number) with respect to an event block that is stored in the internal buffer memory area 14.

The initializing process 23 invokes the unique name determination unit 24. The unique name determination unit 24 stores a unique name that does not overlap the names of the other storage proxies 13 in an area for storing a unique name in the internal buffer memory area 14. At that time, one of the following methods may be selected for setting a unique name. In a first method, in a case in which the metadata server 15 manages names of all the storage proxies 13 that are now running, each storage proxy 13 requires the metadata server 15 to name itself at start-up. The metadata server 15 generates a unique name and returns the generated unique name. In a second method, the storage proxy 13 may set by itself a name that may be considered practically unique by using a random number of a sufficiently great number of digits. In a third method, the IP (Internet Protocol) address of the storage proxy 13 may be used as a unique name.

FIG. 5 is a block diagram relating to a writing and sweeping process of the storage proxy according to the embodiment. The internal component 21, the API dispatch unit 22, the internal buffer management unit 31, and an event block name generation unit 32 perform the following processes for each storage proxy 13.

The internal buffer management unit 31 operates due to the fact that an event writing API or a sweeping API is invoked by the API dispatch unit 22 upon event reception. Upon event reception, the internal buffer management unit 31 buffers stream data writing from the load balancer 12 in the internal buffer memory area 14, and packs the data in an event block of an appropriate size. When the event block length is longer, throughput increases but writing takes a longer time. In contrast, when the event block length is shorter, throughput decreases but writing takes a shorter time.

In a case in which event writing to the internal buffer memory area 14 is performed when the internal buffer memory area 14 is empty, the internal buffer management unit 31 sets the time stamps of the event to the start time and the end time. In a case in which event writing is performed when an event has already been written in the internal buffer memory area 14, the internal buffer management unit 31 sets the time stamp of the event in question to the end time. When sweeping of an internal buffer that will be described later is performed, the internal buffer memory area 14 and start and end time information are erased. Alternatively, a start time and an end time may be collectively set upon sweeping. The details will be described later.

The following methods are employed for packing to an event block and sweeping of the event block, and the following methods may be combined according to specification.

In a first packing and sweeping method, a total data volume of an event block is fixed in advance, and in a case in which writing that exceeds the upper limit of the total data volume of the event block is performed, the internal buffer management unit 31 performs sweeping of the event block.

In a second packing and sweeping method, the number of events is fixed in advance, and the internal buffer management unit 31 performs sweeping of the block in a case in which the number of events reaches the upper limit.

In a third packing and sweeping method, the upper limit of an event stay time is set in advance, and the internal buffer management unit 31 performs sweeping of the block in a case in which the upper limit stay time has passed from the reception time of the leading event.

In a fourth packing and sweeping method, the internal buffer management unit 31 performs sweeping of the event block in a case of explicitly receiving a sweeping request from an external application by using the API.

The internal buffer management unit 31 inquires with the event block name generation unit 32 about the event block name. Then, the event block name generation unit 32 gives a unique name to the event block. Here, in a case of naming the event block, the event block name generation unit 32 reads out from the internal buffer memory area 14 the stream name, the unique name of the storage proxy itself, and the sequence number with respect to the event block. The event block name generation unit 32 sets as the event block name unique information that is obtained by making a set of the stream name, unique name and sequence number that have been read out. The event block name generation unit 32 transmits the event block name to the internal buffer management unit 31. Furthermore, the event block name generation unit 32 increments the sequence number that is stored in the internal buffer memory area 14.

When receiving a data transfer request, the internal buffer management unit 31 transmits to the storage node 16 that is determined from the event block name the event block name and the event block that was retained in the internal buffer memory area 14, and makes a writing request to the storage node 16.

The internal buffer management unit 31 sets as interval information the start time and the end time of event data that constitutes the event block and updates the start time and the end time in the internal buffer memory area 14. The internal buffer management unit 31 transmits to the metadata server 15 [interval information, event block name]. Note that in the case of specifying upon reproduction the start and end of an interval by using an event number, "time" may be read as "event number".

Figure 6:
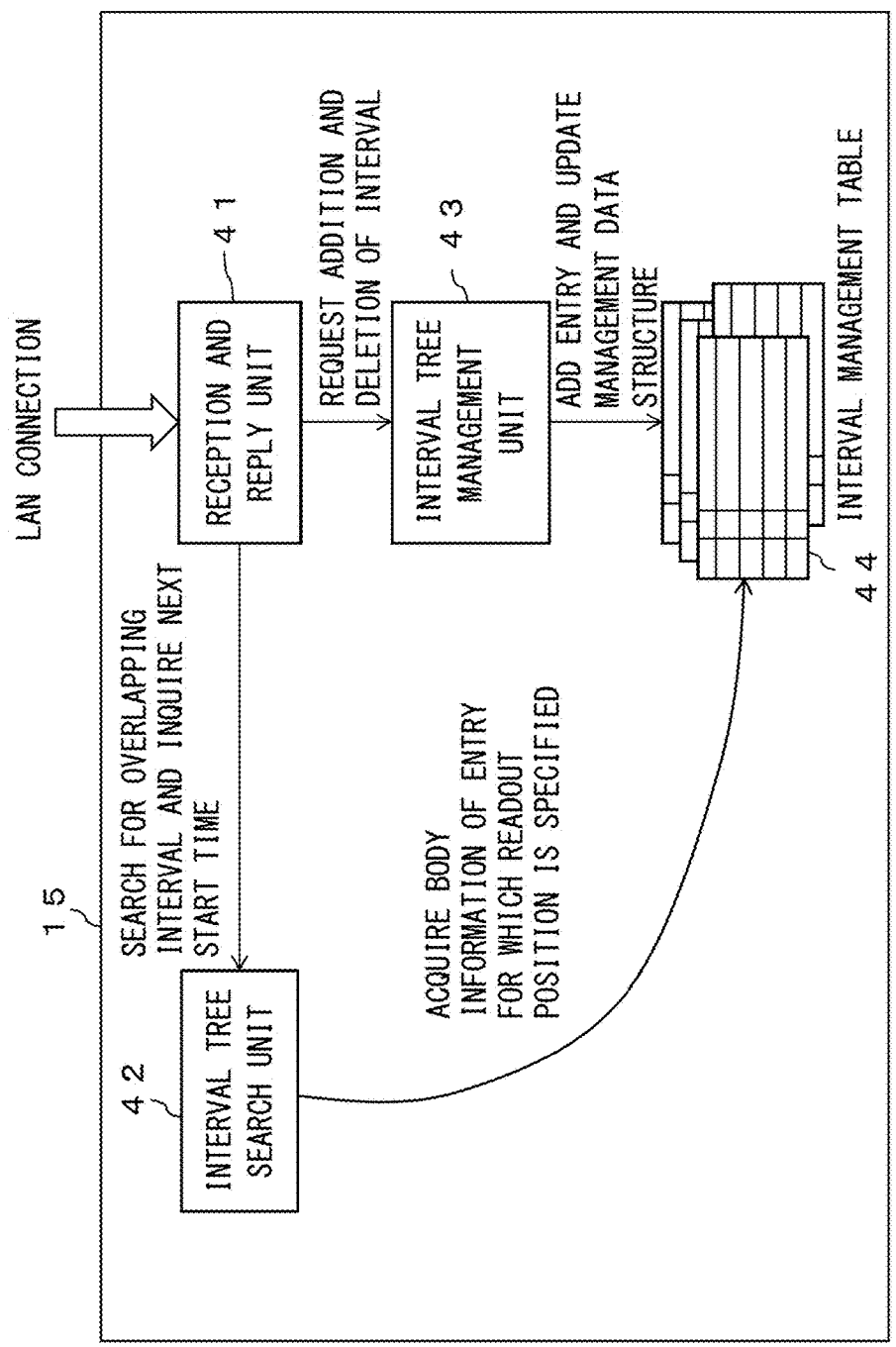
FIG. 6 is a block diagram of a metadata server according to the embodiment.

FIG. 6 is a block diagram of a metadata server according to the embodiment. The metadata server 15 includes a reception and reply unit 41, an interval tree search unit 42, an interval tree management unit 43, and an interval management table 44. The interval management table 44 is managed for each stream.

The reception and reply unit 41 receives a request from the reproduction client 50 via a LAN (Local Area Network). In response to the request, the reception and reply unit 41 requests the interval tree search unit 42 to search for an overlapping interval and inquires with the interval tree search unit 42 about the next start time. Here, an overlapping interval means an interval that includes an event block that overlaps a time interval (from a start time to an end time) for which a search request is made. The reception and reply unit 41 transmits to the reproduction client 50 the request result as a reply to the request. In addition, the reception and reply unit 41 makes an interval addition or deletion request to the interval tree management unit 43 in response to a request from the reproduction client 50.

The interval tree search unit 42 acquires the stream name that is included in the request or inquiry that has been transmitted from the reception and reply unit 41, and selects the interval management table 44 that corresponds to the stream name. The interval tree search unit 42 acquires from the selected interval management table 44 body information of an entry for which a read position is specified (information such as "end time", "event block name", "data structure for management", etc. in FIG. 7) according to the request or inquiry that has been transmitted from the reception and reply unit 41.

The interval tree management unit 43 acquires the stream name that is included in the request that has been transmitted from the reception and reply unit 41, and selects the interval management table 44 that corresponds to the stream name. The interval tree management unit 43 adds the entry to the selected interval management table 44 or updates the management data structure according to the request that has been transmitted from the reception and reply unit 41.

FIG. 7 illustrates an example of the interval management table according to the embodiment. An interval tree is individually managed for each stream. The interval tree management unit 43 registers "event block name" 44-4, "start time" 44-2, and "end time" 44-3 in the interval management table that is managed in a tree structure by using time information as a key and manages them. An example of the interval management table 44 is "interval tree", which is illustrated in a data structure that employs a type of a tree structure. An entry of the interval management table includes "record number" 44-1, "start time" 44-2, "end time" 44-3, "event block name" 44-4, and "data structure for management" 44-5.

"Data structure for management" 44-5 differs according to an algorithm that realizes interval management. In a case in which an interval tree is a red-black tree, "data structure for management" 44-5 includes binary color information, a record number of its left subtree, a record structure of its right subtree, a parent record number, the minimum start time from among start times of itself and its right and left subtrees, and the maximum end time from among start times of itself and its right and left subtrees.

In regard to operations for the interval management table 44, interval addition and deletion operations are implemented in the interval tree management unit 43, and interval search is implemented in the interval tree search unit 42.

In case of interval addition, when (start time, end time, event block name) are given, the interval tree management unit 43 adds the entry illustrated in FIG. 7 and sets the interval tree management data structure so as to satisfy the following red-black tree conditions. In a case in which a binary search tree satisfies the following red-black tree conditions, the binary search tree is a red-black tree.
(1) Every node is either red or black.
(2) Every leaf (the value of a leaf is empty (NIL)) is black.
(3) If a node is red, both its children are black.
(4) Every single path from a node to a descendant contains the same number of black nodes.

In the case of interval deletion, when a record number of an entry that is a deletion target is given, the interval tree management unit 43 deletes the designated entry while satisfying the red-black tree conditions with respect to the management data structures of the other entries.

In the case of an interval search, when (start time, end time) are given, the interval tree search unit 42 obtains all pieces of interval information that overlap the interval in question (=a list of record numbers) from the interval tree management data structure.

Procedures with respect to the interval search will be described in detail in a search process of the metadata server 15. Note that interval addition and deletion may be executed in O(log n) (here, n is the total number of intervals) execution time, and the interval search may be executed in O(klog n) (here, k is the total number of intervals that are answers) execution time, and therefore the interval addition and deletion and the interval search are preferable as an interval management method.

Next, the reproduction process of the stream storage system 11 will be described in detail.

Figure 8:
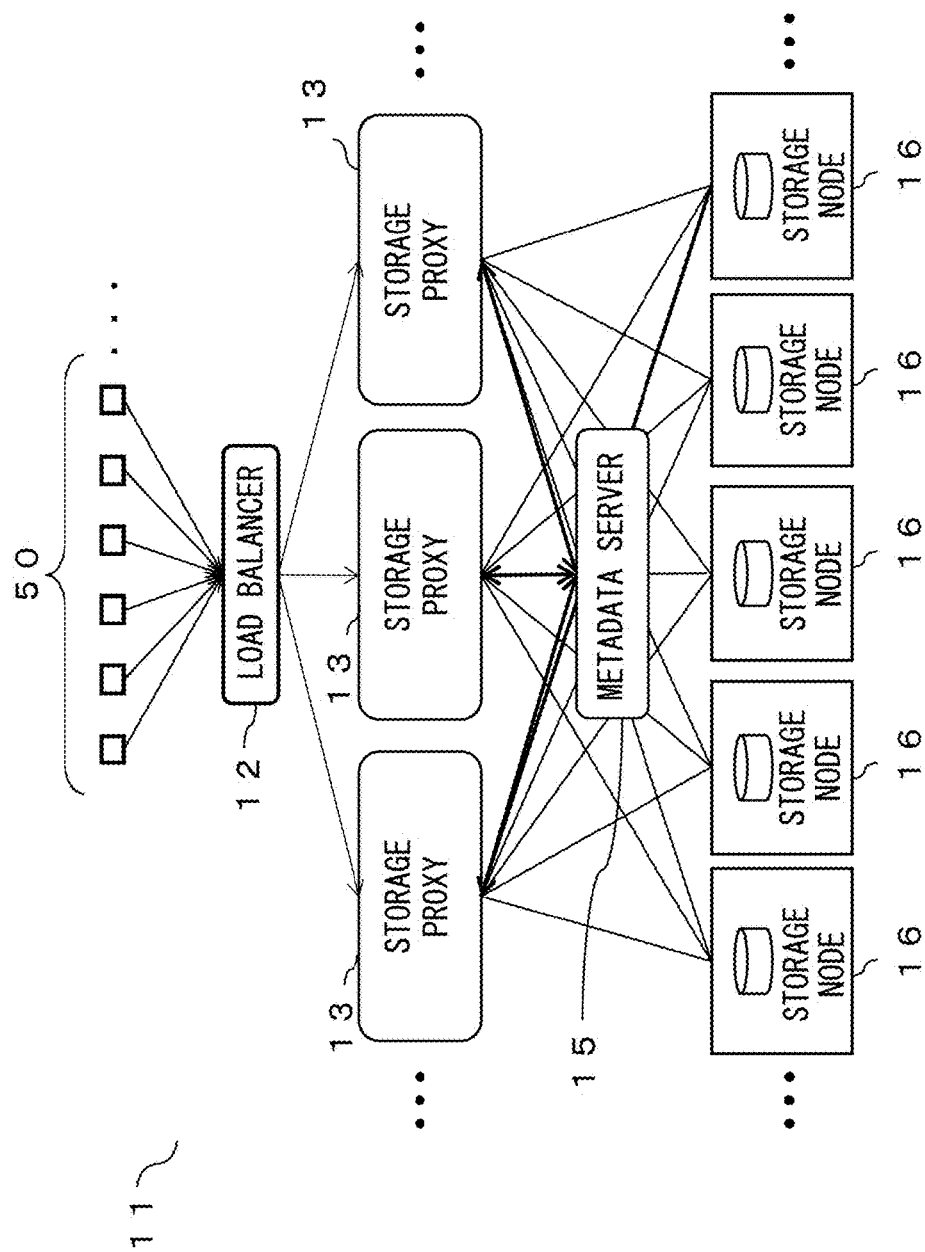
FIG. 8 illustrates an example of a stream storage system relating to reproduction of stream data according to the embodiment.

FIG. 8 illustrates an example of the stream storage system relating to reproduction of stream data according to the embodiment. A CEP (Complex Event Processing) engine is a core program in an RTAP process. An application program such as the CEP engine or a user application acquires via a component of the stream storage system 11 stream data that has been accumulated in the stream storage system 11. An information processing device that reproduces stream data in the above manner is referred to as the reproduction client 50. In addition, an external application program such as the CEP engine or the user application program is hereinafter referred to as an external app. The external app runs on the reproduction client 50.

The external app designates information for identifying a stream. Then, the reproduction client 50 may specify stream data that corresponds to the information for identifying the stream and that has been distributed in each storage node 16 via the storage proxy 13 by using the specified API.

Figure 9:
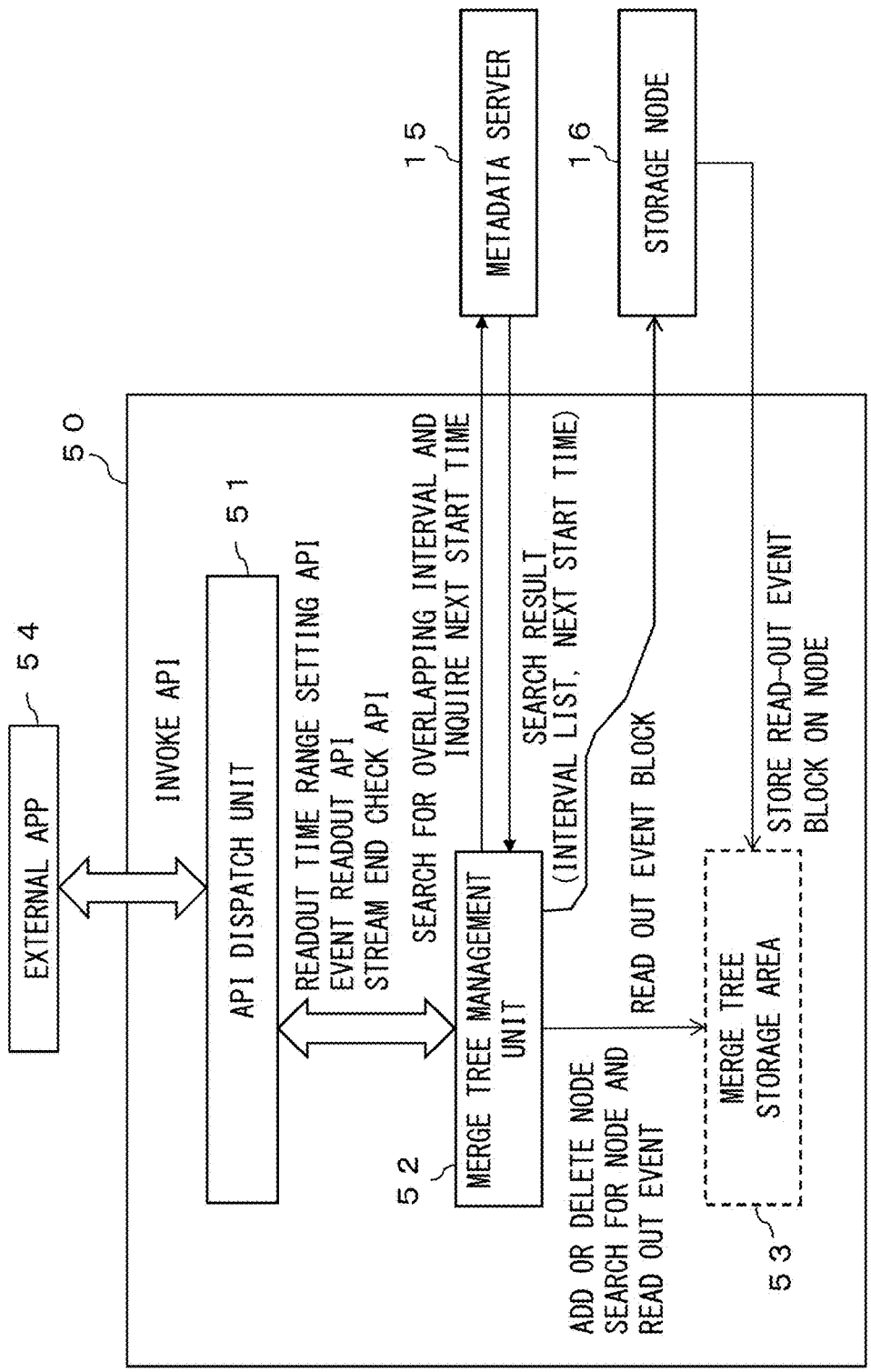
FIG. 9 is a block diagram of a reproduction client according to the embodiment.

FIG. 9 is a block diagram of the reproduction client according to the embodiment. A stream reproduction process that uses the reproduction client 50 is as follows. An external app 54 requests the reproduction client 50 to acquire events of stream data to be reproduced. At that time, the external app 54 invokes the API by means of an API dispatch unit 51 of the reproduction client 50 and designates the name of the stream to be reproduced, the start time, and the end time. The start time and the end time may be omitted. In a case in which the start time and the end time are omitted, the time stamp of the leading data of the stream and the time stamp of the last data of the stream are used in their place.

The reproduction client 50 has, for example, the following APIs, and may acquire without omission all the events that the external app requires by using the APIs.
API that sets a reproduction time range (start time and end time)
API that checks whether or not all the events within the designated time interval have been read out
API that checks whether or not it is the end of the stream
API that acquires an event
API that updates time information of the stream end (This API is useful in a situation in which a stream is written asynchronously.)

These APIs cause a merge tree management unit 52 to operate. The merge tree management unit 52 inquires with the metadata server 15 about the overlapping interval of the stream data to be reproduced and the next start time. The metadata server 15 transmits to the merge tree management unit 52 the list of the overlapping intervals that have been searched for and the next start time as a search result.

The merge tree management unit 52 requests via the storage proxy 13 the storage node 16 to read out an event block according to the list of overlapping intervals. The event block that has been read out from the storage node 16 is stored in a merge tree storage area 53 of the reproduction client 50 via the storage proxy 13. A merge tree is a data structure that is formed of a binary tree and illustrates a tree-shaped data structure for adding to a node of the binary tree an event block that has been read out from the storage node 16 and arraying event blocks in order of time key. In this embodiment, a red-black tree is used as an example of the binary tree. The reproduction client 50 stores an event block that has been read out from the storage node 16 on a node of the merge tree.

The merge tree management unit 52 adds, deletes, and searches for a node with respect to a merge tree that is stored in the merge tree storage area 53, and reads out an event from the merge tree.

First, reading out of an event block will be described. In a case in which the external app 54 designates the reproduction start time and end time, the reproduction client 50 divides a time interval in the designated range and makes an inquiry to the stream storage system 11 step by step, which will be described with reference to FIG. 10.

Figure 10:
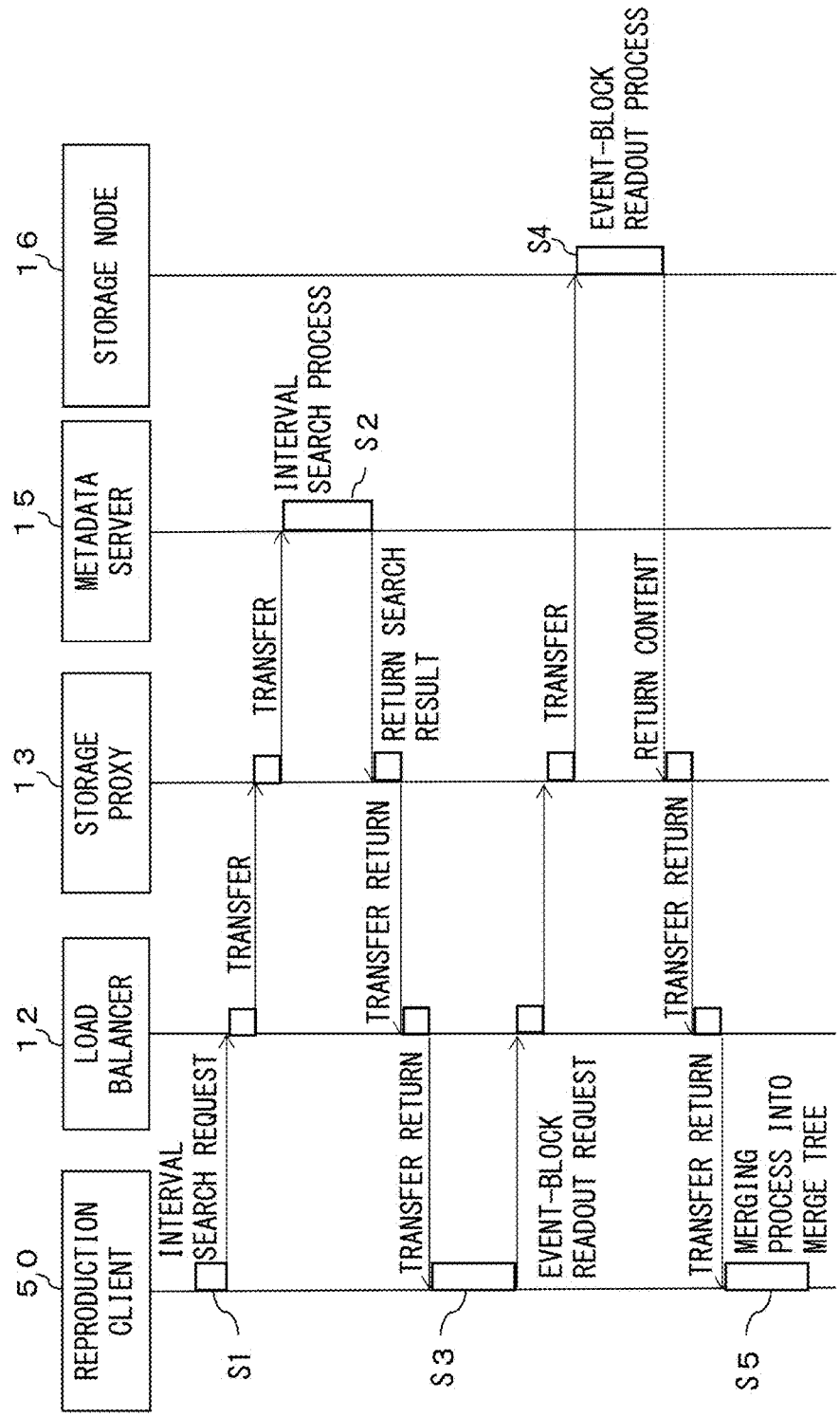
FIG. 10 illustrates an example of a reproduction sequence according to the embodiment.

FIG. 10 illustrates an example of a reproduction sequence according to the embodiment. The reproduction client 50 requests the metadata server 15 to search an interval of the stream data to be reproduced via the load balancer 12 and the storage proxy 13 (S1). Here, the reproduction client 50 inputs an interval from a reproduction start time to a time at which Δ time has passed from the start time, and makes an inquiry to the metadata server 15.

The metadata server 15 performs an interval search process of the stream data to be reproduced in response to the inquiry from the reproduction client 50 (S2). Here, the metadata server 15 transmits to the reproduction client 50 an event block set that has interval information that overlaps the time interval of the stream data to be reproduced about which the inquiry was made (that is, an overlapping interval). At that time, the metadata server 15 includes information of a "next start time" in the reply.

The reproduction client 50 receives the reply from the metadata server 15. Then, the reproduction client 50 uses the event block name that has been obtained from the reply and reads out the event block from the storage node 16 (S3 and S4). A process for reading out a plurality of events and merging the events into a merge tree, which will be described in detail hereinafter, may be sequentially performed or may be performed in parallel (asynchronously).

The reproduction client 50 merges the event block that has been read out from the storage node 16 into the merge tree (S5). Here, reading out of the event block and addition of the event block to the merge tree may be performed asynchronously by using delay execution. Delay execution will be described later.

The reproduction client 50 sets as a start time "next start time", which has been obtained from the reply to the inquiry to the metadata server 15. In a case in which the start time does not reach the end time, the reproduction client 50 requests again the metadata server 15 to search the interval of the stream data to be reproduced (S1).

Figure 11:
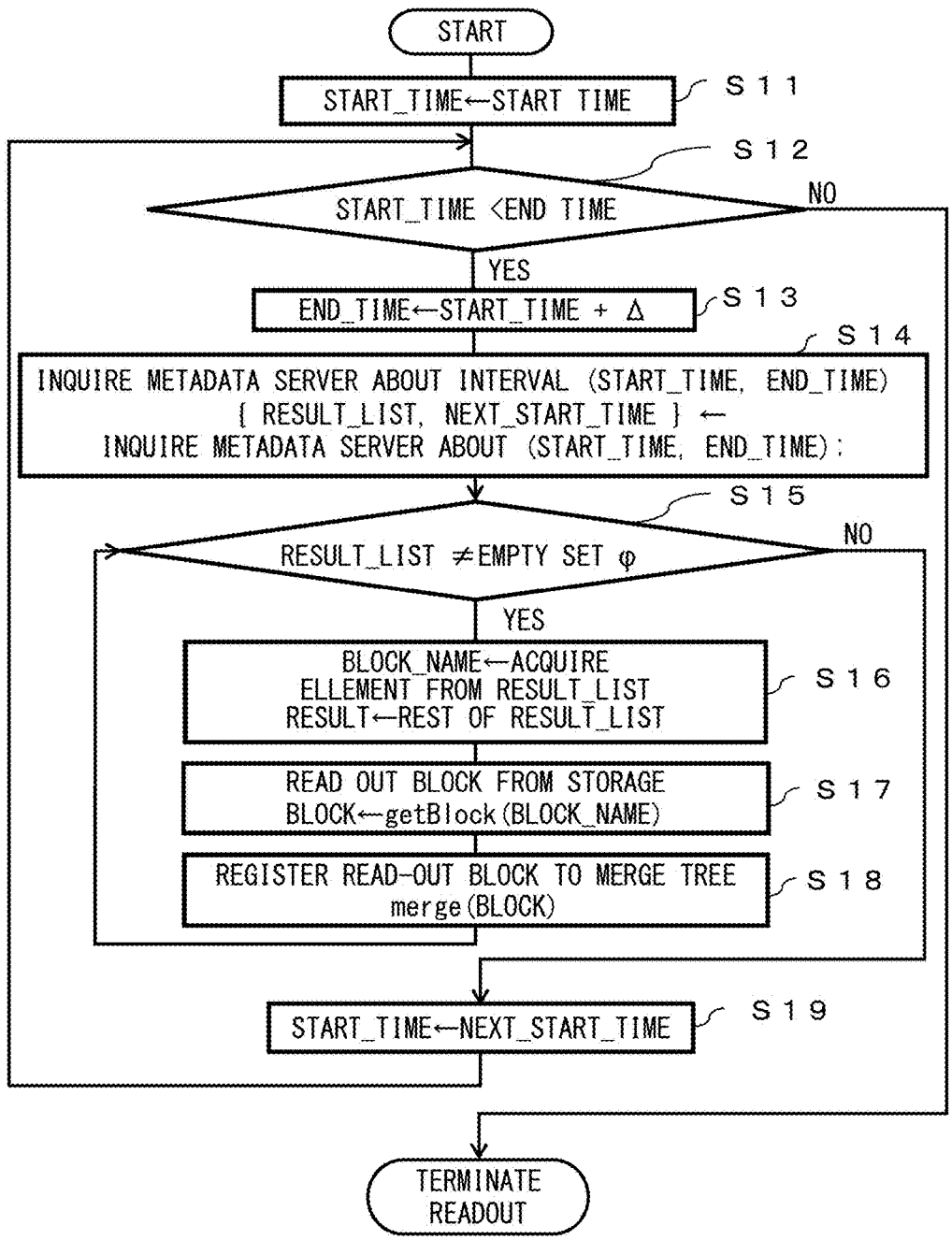
FIG. 11 illustrates an example of an inquiry flow for reproduction that is performed by the reproduction client according to the embodiment.

FIG. 11 illustrates an example of an inquiry flow for reproduction that is performed by the reproduction client according to the embodiment. As described, the external app 54 invokes the API of the reproduction client 50 and designates the name of the stream to be reproduced, the start time, and the end time.

The reproduction client 50 sets the start time to the parameter START_TIME (S11). In a case in which START_TIME<end time ("Yes" in S12), the reproduction client 50 sets to the parameter END_TIME the time that is obtained by adding Δ time to START_TIME (S13). Here, it is assumed that Δ is a minimum time width for inquiry.

The reproduction client 50 inquires with the metadata server 15 about an interval (START_TIME, END_TIME) (corresponding to S1 in FIG. 10). The metadata server 15 transmits to the reproduction client 50 the set of names of event blocks that have interval information that overlaps the time interval about which the inquiry was made. At that time, the metadata server 15 causes information of the "next start time" to be included in the reply (corresponding to S2 in FIG. 10). When receiving the reply from the metadata server 15, the reproduction client 50 sets the sets of event block names to the parameter RESULT_LIST, and sets "next start time" to the parameter NEXT_START_TIME (S14). A method for determining the "next start time" will be described later in FIGS. 20 and 21.

In a case in which RESULT_LIST is not an empty set φ ("Yes" in S15), the reproduction client 50 extracts one element (event block) from RESULT_LIST, and sets the one element to the parameter BLOCK_NAME. The reproduction client 50 sets to RESULT_LIST the remaining elements of RESULT_LIST (S16).

The reproduction client 50 reads out the event block that corresponds to BLOCK_NAME from the storage node 16 (corresponding to S3 in FIG. 10). The reproduction client 50 sets to the parameter BLOCK the event block that has been read out from the storage node 16 (S17). The reproduction client 50 registers the BLOCK to the merge tree (S18).

The processes in S16-S18 will be repeated until RESULT_LIST becomes an empty set φ. In a case in which RESULT_LIST becomes an empty set φ ("No" in S15), the reproduction client 50 sets to START_TIME the value of NEXT_START_TIME (S19), and returns to the process in S12.

While START_TIME<end time, the reproduction client 50 repeats S12-S19. In a case in which START_TIME≥end time (S12), the reproduction client 50 terminates an event-block readout process.

Figure 12:
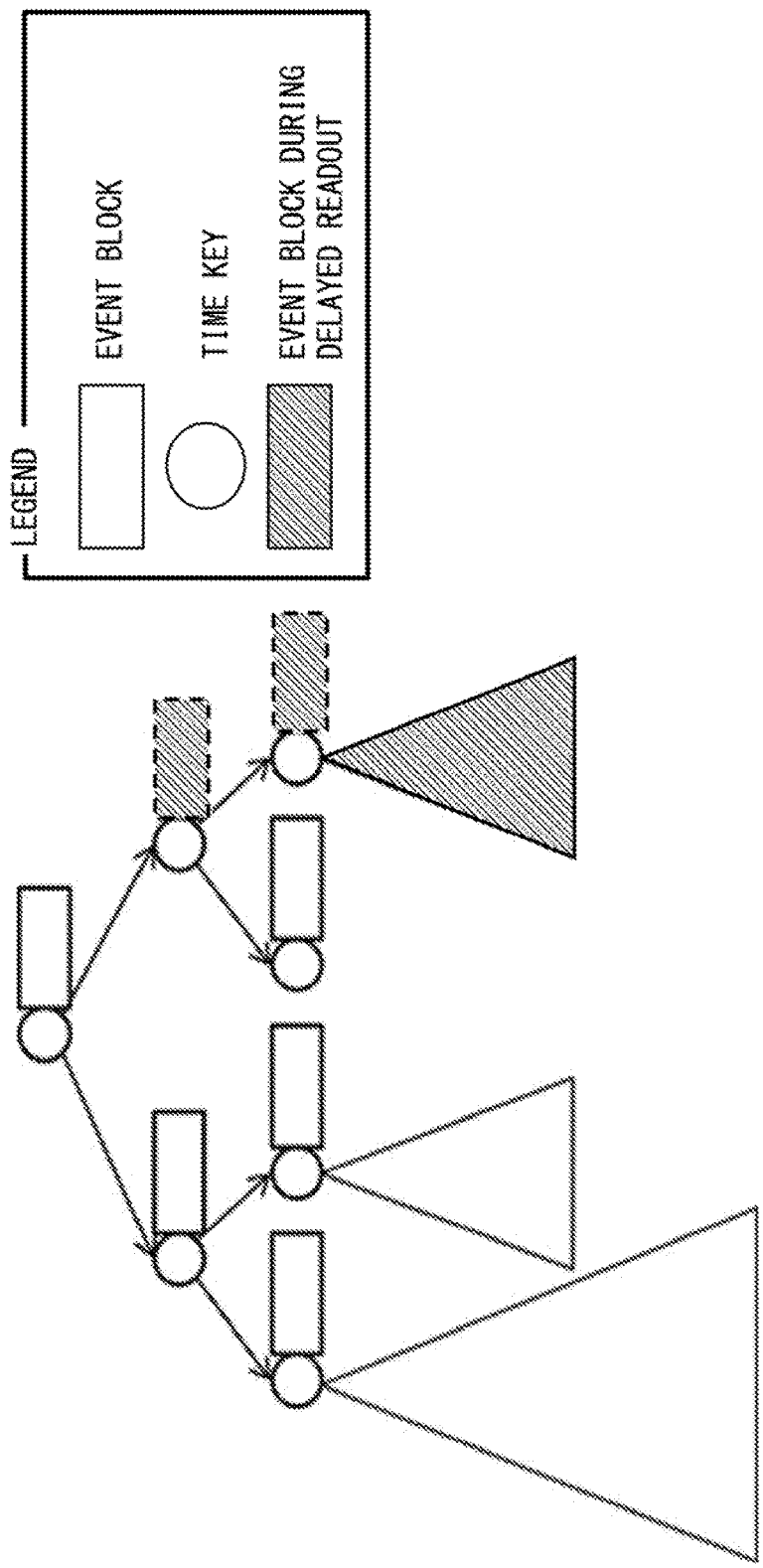
FIG. 12 illustrates an example of a merge tree according to the embodiment.
Figure 14:
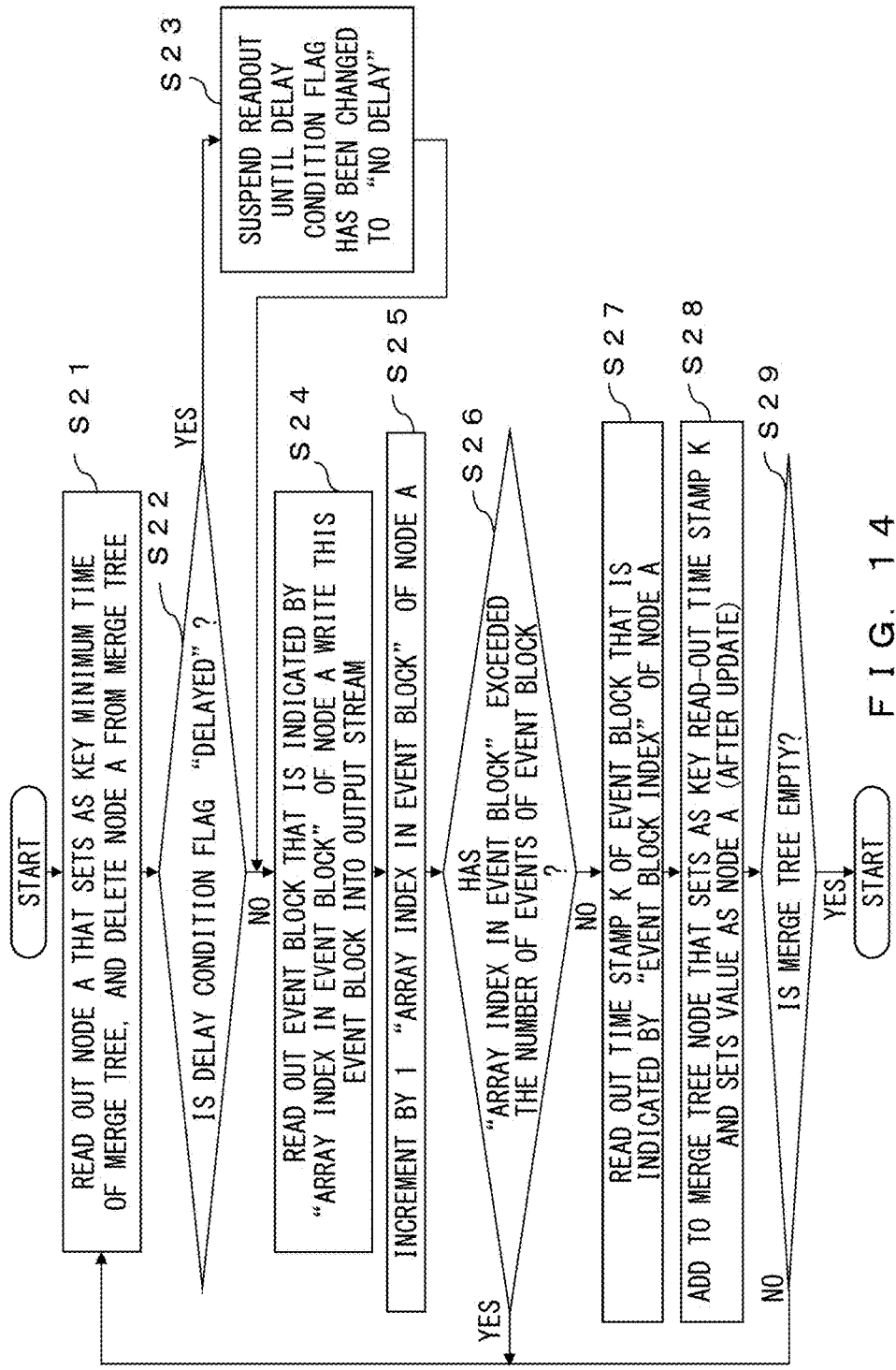
FIG. 14 illustrates an example of a flow of a process for reading out an event-block from the merge tree according to the embodiment.

When a reproduction inquiry process in FIG. 12 is performed asynchronously with a readout process in FIG. 14, all the blocks from the reproduction start time to the reproduction end time are retained on the merge tree, that is, on a memory. Thus, in a case in which the data volume is enormous, it is preferable to perform the reproduction inquiry process at a pace which is set by taking the system resources into consideration. In an example of a method for adjusting the pace of inquiry, after a data of one block has been read out in the readout process, one block is acquired from the storage node.

Next, event-block readout from the merge tree will be described. The event block that has been read out from the storage node 16 is merged into a data structure called a merge tree, illustrated in FIG. 12. In FIG. 12, a white square indicates an event block, a circle indicates a time key, and a hatched square indicates an event block during delayed reading. The node of the merge tree has a data structure illustrated in FIG. 13. A node structure 61 of the merge tree includes the data items (fields) "time key", "delay condition flag", "array index in event block" and "event block". Hereinafter, a field inside a node is denoted by "field name". In a case in which the type of a field is not explicitly indicated, the type will be one that may be easily estimated from the name. For example, "event block" means an event-block field on a node and is a reference type for the instance of the event block that has been read on the memory.

A process for adding a new node to the merge tree is performed in the event-block readout process that was described in FIGS. 10 and 11. In the case of adding a node to the merge tree after an event-block readout, the reproduction client 50 initializes the node under the assumption of the following A1-A4.

(A1) Time key is set to the time stamp of the leading event of the block.
(A2) "Delay condition flag" is set to "no delay".
(A3) "Array index in event block" is set to 0 (leading end). (Special treatment is preferable with respect to a first turn of an event block readout loop in FIG. 11. Index is advanced to the event that has the time stamp that is later than or equal to the start time.)
(A4) In "event block", reference to the instance of the read out event block is set.

In the case of adding a node to the merge tree before completion of block readout, the reproduction client 50 performs processes in the same manner as described in the following (B1) and (B2).
(B1) The time key is set to the start time in the interval information that has been acquired from the metadata server 15.
(B2) "Delay condition flag" is set to "delayed".

In both the case of adding a node to the merge tree after the event-block readout and the case of adding a node to the merge tree before completion of the block readout, the time key is set. Therefore, the reproduction client 50 may arrange an additional node at an appropriate position of the merge tree.

FIG. 14 illustrates an example of the flow of a process for reading out an event block from the merge tree according to the embodiment. The reproduction client 50 reads out node A, which sets as a key the minimum time of the merge tree, and deletes node A from the merge tree (S21). Here, in a case in which there are a plurality of nodes whose minimum times are the same, the reproduction client 50 determines the magnitude relationship according to the name of the event block. Since it is guaranteed that each event block name is unique, once the order of names are set, the magnitude relationship of the nodes is uniquely set.

In a case in which the delay condition flag with respect to node A is "delayed" ("Yes" in S22), the reproduction client 50 suspends reading out of the event block that corresponds to the node until the delay condition flag has been changed to "no delay" (S23). Here, since the event block that corresponds to node A is being read out from the storage node 16 as illustrated in FIG. 12, the reproduction client 50 does not read out the event block that corresponds to node A until the readout has been completed.

In a case in which the delay condition flag is "no delay" ("Yes" in S22 or after the process in S23), the reproduction client 50 reads out the event block that is indicated by "array index in event block" of node A. The reproduction client 50 writes the event block to an output stream (S24).

The reproduction client 50 increments the "array index in event block" of node A by one (S25).

In a case in which "array index in event block" exceeds the number of events of the event block ("Yes" in S26), the reproduction client 50 returns to the process in S21.

In a case in which "array index in event block" does not exceed the number of events of the event block ("No" in S26), the reproduction client 50 performs the following process. That is, the reproduction client 50 reads out time stamp K of the event block that is indicated by the "array index in event block" of node A (S27).

The reproduction client 50 adds to the merge tree a node that sets the readout time stamp K as a key and sets the value as node A (after updating) (S28).

The reproduction client 50 repeats the processes in S21-S28 while the merge tree is not empty ("No" in S29).

Figure 15:
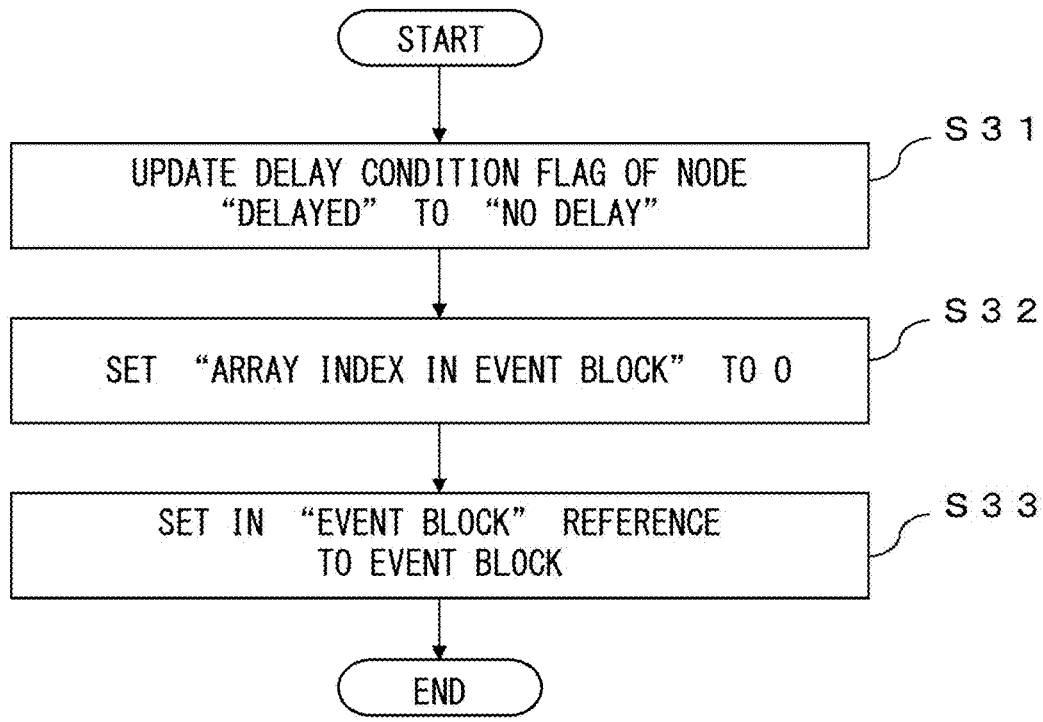
FIG. 15 illustrates an example of a process flow in a case in which reading out of an event block has been completed with respect to a node that is added to the merge tree in a state in which a delay state flag of the node indicates "delayed".

In a case in which reading out of the event block has been completed with respect to the node that has been added to the merge tree with its delay condition flag "delayed", the reproduction client 50 performs a process that is illustrated in FIG. 15. That is, the reproduction client 50 updates the delay condition flag of the node "delayed" to "no delay" (S31).

The reproduction client 50 sets "array index in event block" to 0 (S32). In addition, the reproduction client 50 sets in "event block" reference to the event block (S33).

As described, the reproduction client 50 does not read out the event block that is being read out from the storage node 16 until readout has been completed. In contrast, the reproduction client 50 reads out event blocks that have been read out, in order of time from the earliest. Therefore, delay occurs with respect to the block that is being read out from the storage node 16. However, the node of the event block that has been readout is readout independently of the delayed event block and is deleted from the merge tree, and an event block is added to the merge tree. Asymmetrically performing event-block readout and event-block addition to the merge tree in the same manner as described above is referred to as delay execution.

Next, a process related to an interval search that is performed by the interval tree search unit 42 of the metadata server 15 will be described.

FIG. 16 illustrates an example of a metadata-server interval-search process flow according to the embodiment. The interval tree search unit 24 performs an interval search according to a request or inquiry from the reception and reply unit 41. At that time, start time s and end time e are given from the reception and reply unit 41 to the interval tree search unit 42.

The interval tree search unit 42 search the interval management table 44 for a root index of the tree, and sets the root index to index variable v. In addition, the interval tree search unit 42 initializes index list variable L (S41).

The interval tree search unit 42 judges by using the interval management table 44 whether or not the reference destination of index variable v is a leaf (NIL). Here, in a red-black tree, a leaf is an (NIL) node that does not have a value. In a case in which the reference destination of index variable v is a leaf (NIL) ("Yes" in S42), the interval tree search unit 42 returns empty index list variable L to the reception and reply unit 41.

In a case in which the reference destination of index variable v is not a leaf (NIL) ("No" in S42), the interval tree search unit 42 calls the function serchAllFromNode(s, e, v) and searches all the nodes (S43), and returns the search result to the reception and reply unit 41. Details of S43 will be described with reference to FIG. 17.

Figure 17:
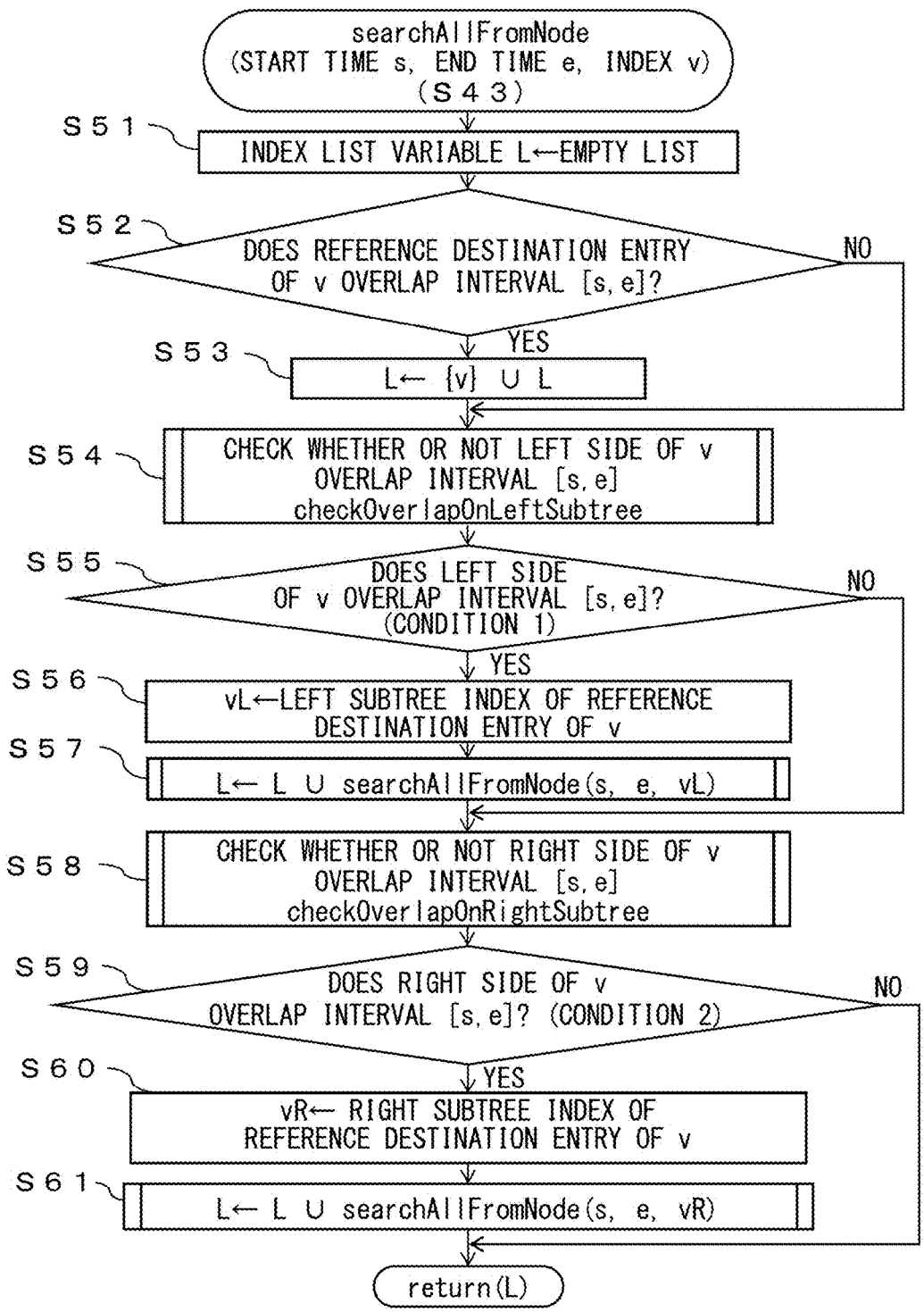
FIG. 17 illustrates an example of a detailed flow of S43 in FIG. 16.

FIG. 17 illustrates an example of a detailed flow of S43 in FIG. 16. The interval search unit 42 gives to the function serchAllFromNode(s, e, v) start time s, end time e, and index variable v. The interval tree search unit 42 initialized index list variable L (S51).

The interval tree search unit 42 judges from the interval management unit 44 whether or not a reference destination entry of index variable v overlaps interval [start time s, end time e] (S52). In a case in which the reference destination entry of index variable v does not overlap interval [start time s, end time e] ("No" in S52), the interval tree search unit 42 proceeds to S54.

In a case in which the reference destination entry of index variable v overlaps interval [start time s, end time e] ("Yes" in S52), the interval tree search unit 42 sets to index list variable L the union of index variable v and index list variable L (S53).

The interval tree search unit 42 calls the function checkOverlapOnLeftSubtree and checks whether or not a tree of the left side of index variable v overlaps interval [start time s, end time e] (S54). Details of S54 will be described in FIG. 18. In a case in which the left side of index variable v does not overlap interval [start time s, end time e] ("No" in S55), the interval tree search unit 42 proceeds to the process in S58.

In a case in which the left side of index variable v does overlap interval [start time s, end time e] ("Yes" in S55), the interval tree search unit 42 sets to variable vL the left subtree index of the reference destination entry of index variable v (S56).

The interval tree search unit 42 calls the function serchAllFromNode, delivers start time s, end time e, and variable vL, performs node search, and recursively performs the search process in FIG. 17 with respect to the left subtree index of the reference destination entry of index variable v.

The interval tree search unit 42 sets to index list variable L the union of the result of serchAllFromNode(s, e, vL) and index list variable L (S57).

The interval tree search unit 42 checks whether or not the right side of index variable v overlaps interval [start time s, end time e] (S58). Details of S58 will be described in FIG. 19. In a case in which the right side of index variable v does not overlap interval [start time s, end time e] ("No" in S59), the interval tree search unit 42 terminates this flow.

In a case in which the right side of index variable v overlaps interval [start time s, end time e] ("Yes" in S59), the interval tree search unit 42 sets to variable vR the right subtree index of the reference destination entry of index variable v (S60).

The interval tree search unit 42 calls the function serchAllFromNode, delivers start time s, end time e, and variable vR, performs node search, and recursively performs the search process in FIG. 17 with respect to the left subtree index of the reference destination entry of index variable v. The interval tree search unit 42 sets to index list variable L the union of the result of serchAllFromNode(s, e, vR) and index list variable L (S61).

Figure 18:
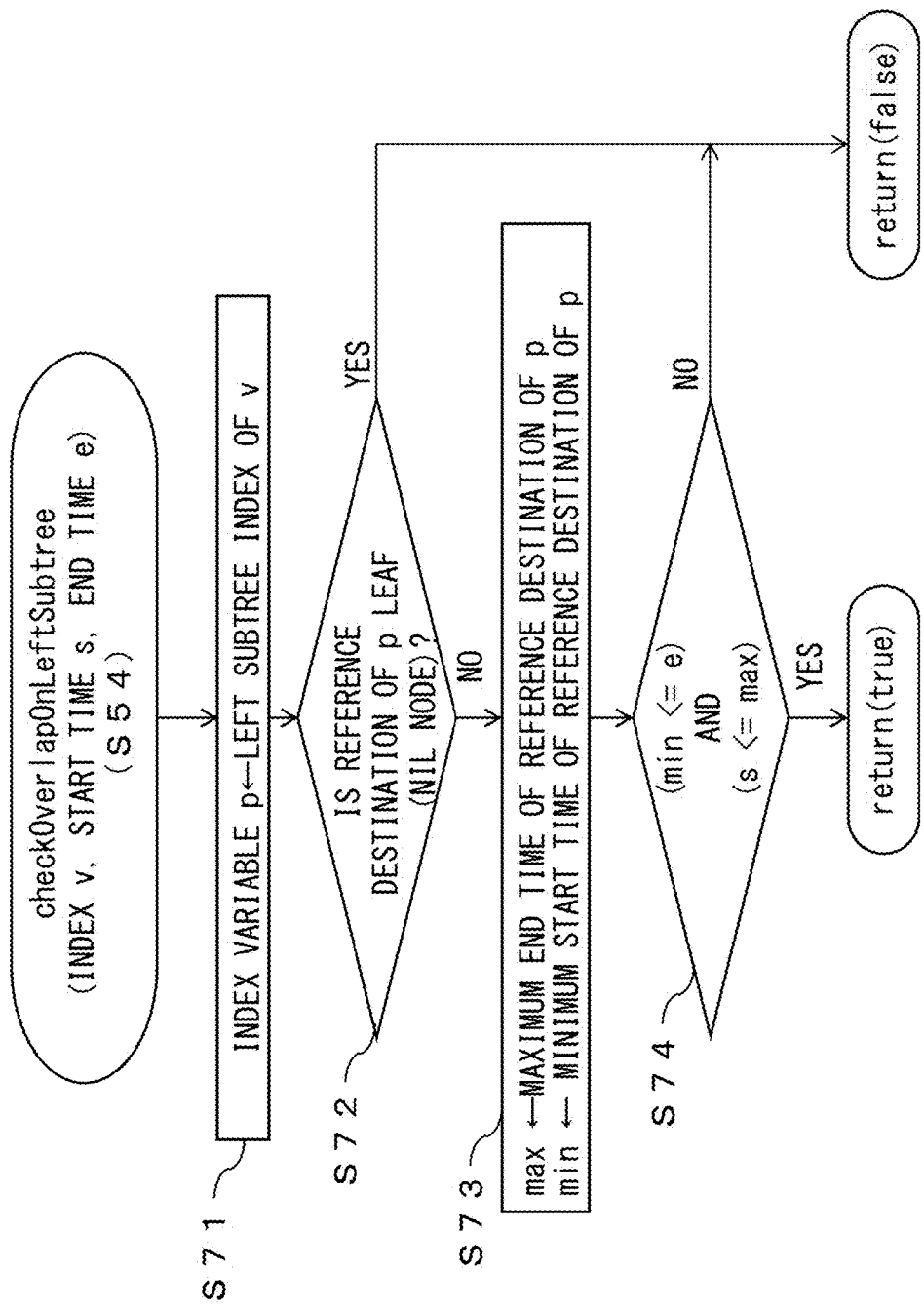
FIG. 18 illustrates an example of a detailed flow of S54 in FIG. 17.

FIG. 18 illustrates an example of a detailed flow of S54 in FIG. 17. When checkOverlapOnLeftSubtree is called, index variable v, start time s, and end time e are delivered.

The interval tree search unit 42 sets to index variable p the left subtree index of index variable v (S71). The interval tree search unit 42 judges whether or not the reference destination of index variable p is a leaf (NIL node) (S72).

In a case in which the reference destination of index variable p is a leaf (NIL node) ("Yes" in S72), the interval tree search unit 42 performs the following process. That is, the interval tree search unit 42 returns "false" as a result of the check that is performed by using the function checkOverlapOnLeftSubtree as to whether or not the left side of index variable v overlaps [start time s, end time e].

In a case in which the reference destination of index variable p is not a leaf (NIL node) ("No" in S72), the interval tree search unit 42 sets to variable max the maximum end time of the reference destination entry of index variable p, and sets to variable min the minimum start time of the reference destination entry of index variable p (S73).

In a case in which variable min>end time e or in a case in which start time s>variable max ("No" in S74), the interval tree search unit 42 performs the following process. That is, the interval tree search unit 42 returns "false" as a result of the check that is performed by using the function checkOverlapOnLeftSubtree as to whether or not the left side of index variable v overlaps [start time s, end time e].

In a case in which variable min≤end time e and start time s≤variable max ("Yes" in S74), the interval tree search unit 42 performs the following process. That is, the interval tree search unit 42 returns "True" as a result of the check that is performed by using the function checkOverlapOnLeftSubtree as to whether or not the left side of index variable v overlaps [start time s, end time e].

Figure 19:
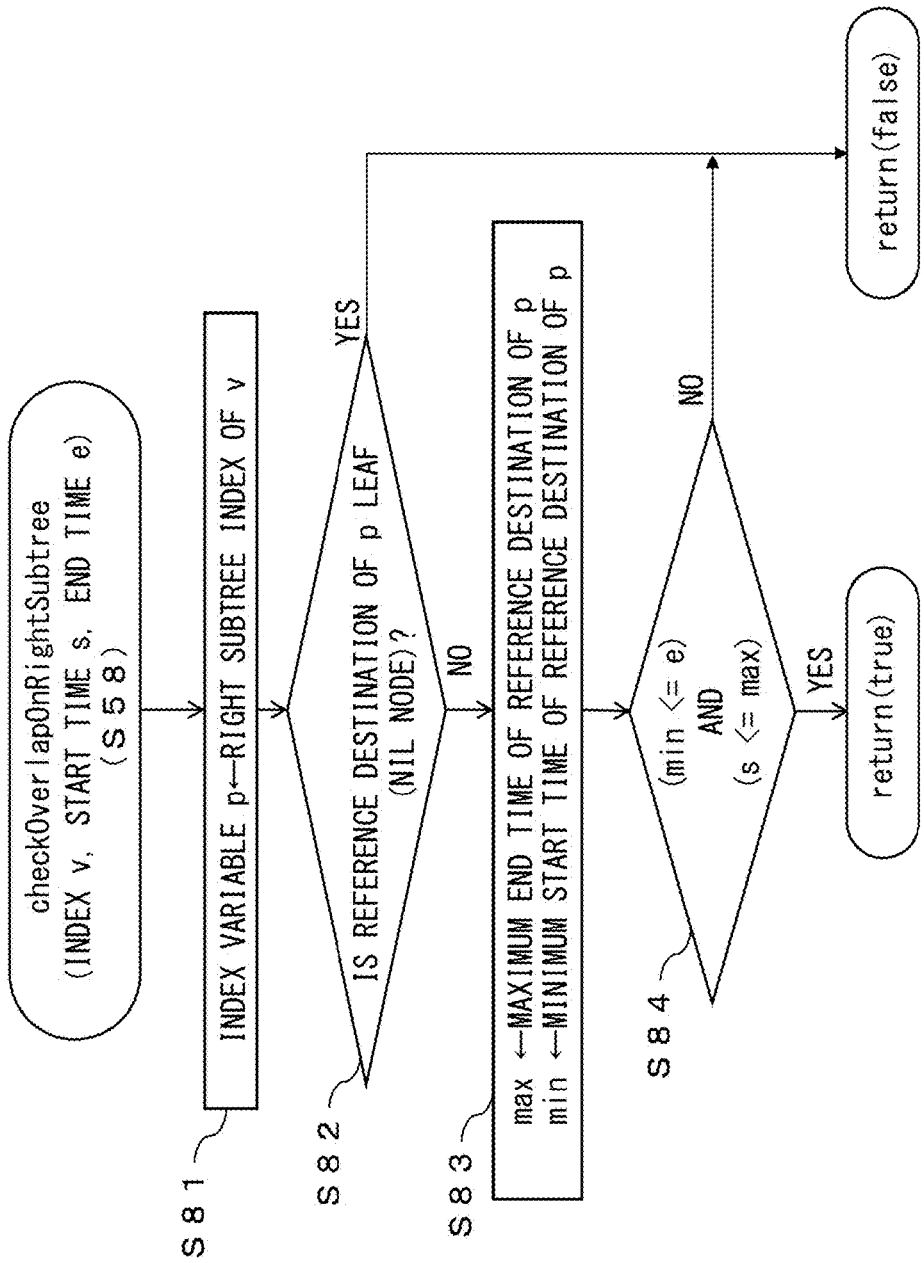
FIG. 19 illustrates an example of a detailed flow of S58 in FIG. 17.

FIG. 19 illustrates an example of a detailed flow of S58 in FIG. 17. When checkOverlapOnRightSubtree is called, index variable v, start time s, and end time e are delivered.

The interval tree search unit 42 sets to index variable p the right subtree index of index variable v (S81). The interval tree search unit 42 judges whether or not the reference destination of index variable p is a leaf (NIL node) (S82).

In a case in which the reference destination of index variable p is a leaf (NIL node) ("Yes" in S82), the interval tree search unit 42 performs the following process. That is, the interval tree search unit 42 returns "false" as a result of the check that is performed by using the function checkOverlapOnRightSubtree as to whether or not the right side of index variable v overlaps [start time s, end time e].

In a case in which the reference destination of index variable p is not a leaf (NIL node) ("No" in S82), the interval tree search unit 42 sets to variable max the maximum end time of the reference destination entry of index variable p, and sets to variable min the minimum start time of the reference destination entry of index variable p (S83).

In a case in which variable min>end time e or in a case in which start time s>variable max ("No" in S84), the interval tree search unit 42 performs the following process. That is, the interval tree search unit 42 returns "false" as a result of the check that is performed by using the function checkOverlapOnRightSubtree as to whether or not the right side of index variable v overlaps [start time s, end time e].

In a case in which variable min≤end time e and start time s≤variable max ("Yes" in S84), the interval tree search unit 42 performs the following process. That is, the interval tree search unit 42 returns "True" as a result of the check that is performed by using the function checkOverlapOnRightSubtree as to whether or not the right side of index variable v overlaps [start time s, end time e].

Next, a method will be described with reference to FIGS. 20 and 21 for acquiring "next start time", which is included in the replay to the reproduction client 50 in S2 in FIG. 10, specifically, the determined "next start time" in S14 in FIG. 11.

It is assumed that the reproduction client 50 transmits in advance to the metadata server 15 an inquiry message that includes (reproduction start time, reproduction end time) as parameters. At that time, when the metadata server 15 receives the message, in a case in which the message relates to an interval search, the metadata server 15 causes the interval tree search unit 42 to perform the interval search.

The interval tree search unit 42 executes searchAllFromRoot (reproduction start time, reproduction end time), and obtains an index list of entries that overlap the interval in question. The interval tree search unit 42 reads out from the index list a set of three data items (block name, start time, end time) of each of the entries, and generates a list L1 of the sets of three data items.

The interval tree search unit 42 executes searchMinAfter (reproduction end time) and determines "next start time". The metadata server 15 transmits to the reproduction client 50 list L1 and the determined "next start time" as a pair.

Figure 20:
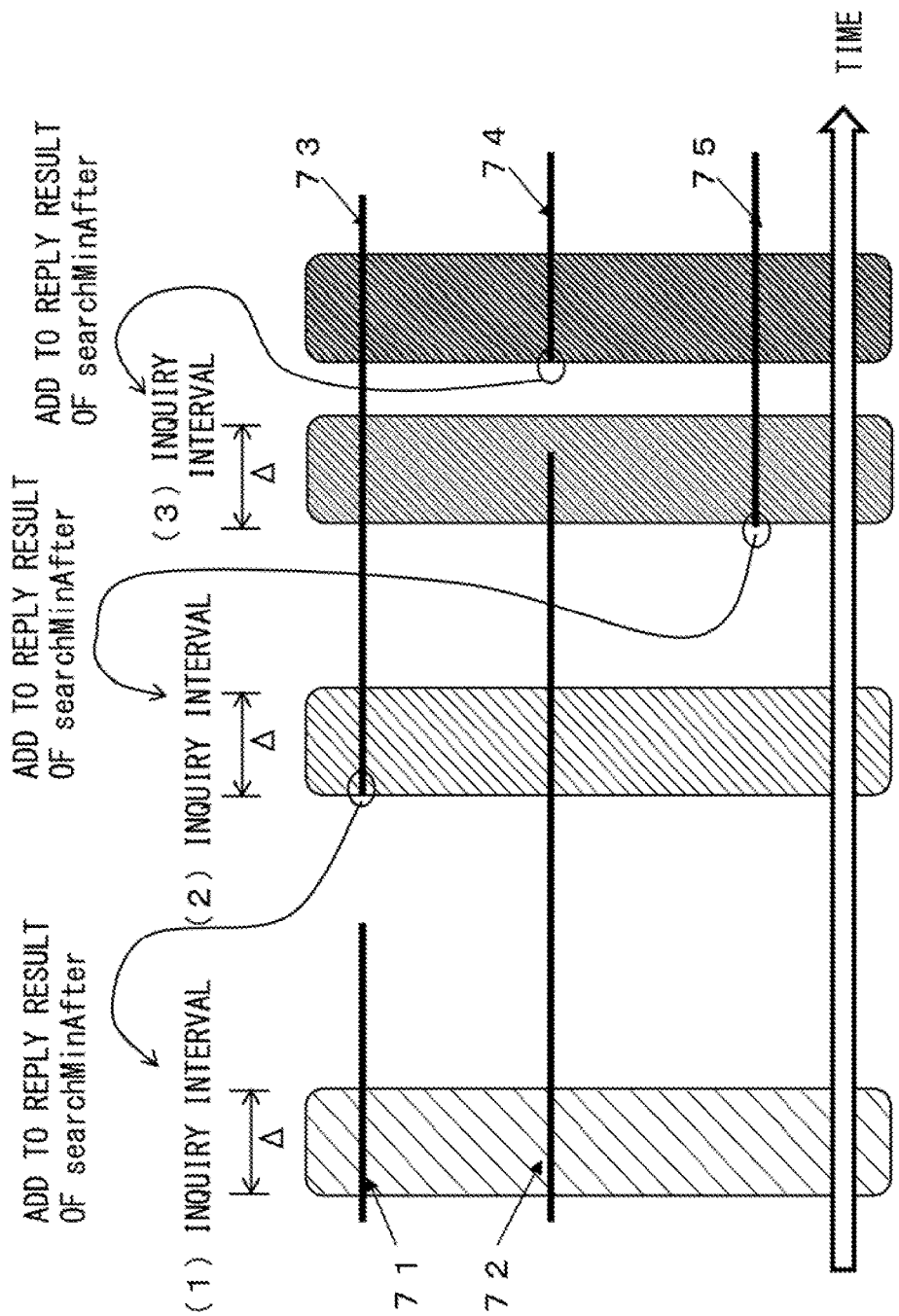
FIG. 20 is a diagram explaining a method for determining a "next start time" according to the embodiment.

FIG. 20 is a diagram explaining a method for determining the "next start time" according to the embodiment. In FIG. 20, searchMinAfter is a function for returning the "next start time" in FIG. 20. Bold lines 71, 72, 73, 74, and 75 in the horizontal direction illustrate event blocks.

It is assumed that a set of event blocks that overlap interval (START_TIME, START_TIME+Δ) is S. When there are event blocks that are not included in set S and whose start times are greater than START_TIME+Δ and before inquiry end time END_TIME, the minimum start time among the start times of the event blocks is defined as the "next start time" of inquiry.

"Next start time" will be described by using, for example, (1) inquiry interval in FIG. 20 as an example. Here, it is assumed that each of event blocks 71-75 is an event block that is before inquiry end time END_TIME. Set S of event blocks that overlap interval (START_TIME, START_TIME+Δ) is composed of event blocks 71 and 72. At that time, event blocks that are not included in set S and whose start time is greater than START_TIME+Δ and before inquiry end time END_TIME are event blocks 73-75. Since event block 73 has the minimum start time from among the start times of the blocks, the minimum start time is determined to be "next start time".

As described, even if an inquiry is made before "next start time", only a subset of set S may be obtained. Therefore, it is possible to optimize the number of times inquiries are made.

Figure 21:
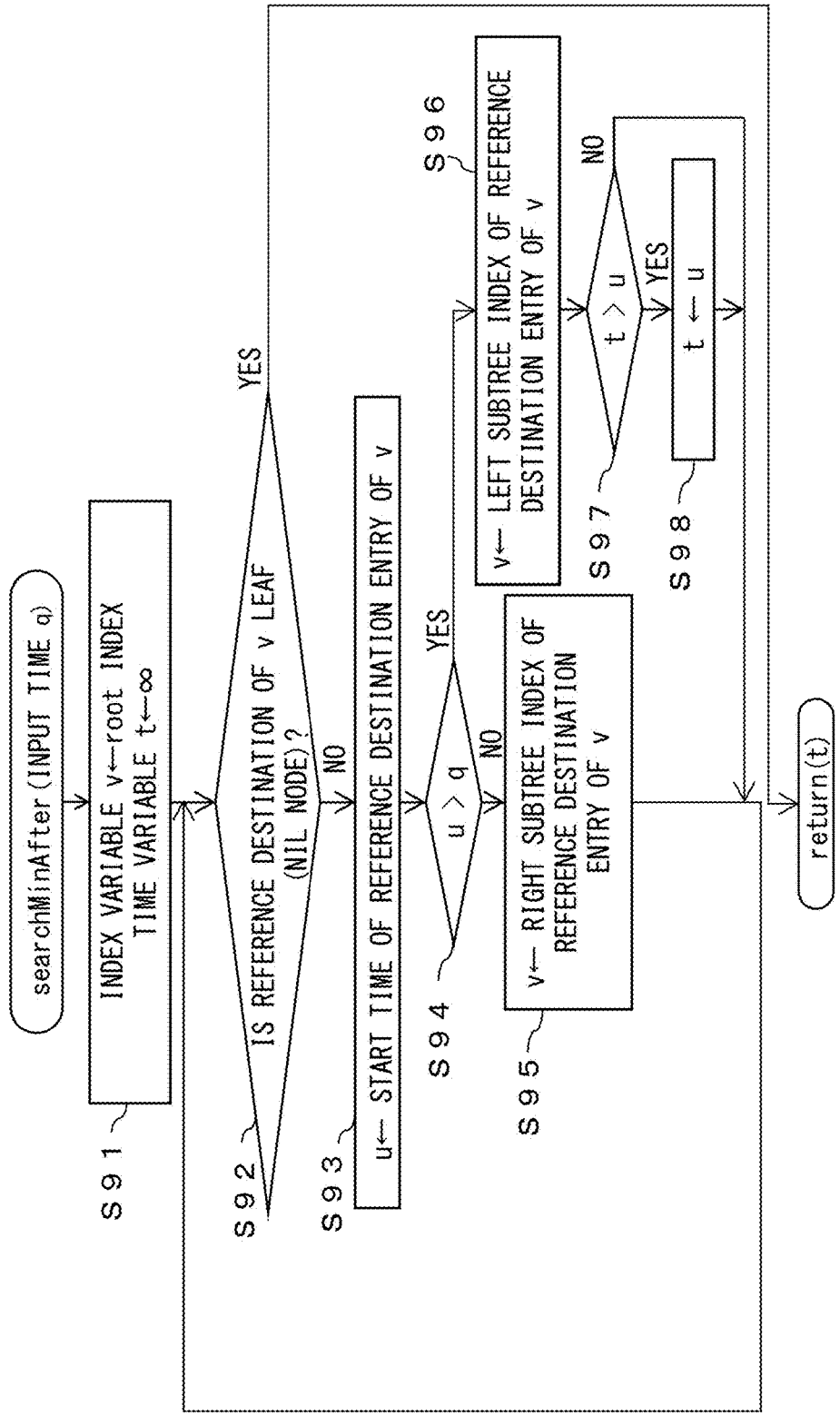
FIG. 21 illustrates an example of a process flow for determining a "next start time" according to the embodiment.

FIG. 21 illustrates an example of a process flow for determining "next start time" according to the embodiment. The interval tree search unit 42 searches the interval management table 44 for a root index of the tree, and sets the root index to index variable v. In addition, the interval tree search unit 42 initializes time variable t to "∞". (S91).

The interval tree search unit 42 uses the interval management table 44 and judges whether or not the reference destination of index variable v is a leaf (NIL) (S92). In a case in which the reference destination of index variable v is not a leaf (NIL) ("No" in S92), the interval tree search unit 42 sets to variable u the start time of the reference destination entry of index variable v (S93).

In a case in which variable u>input time q ("No" in S94), the interval tree search unit 42 sets to index variable v the right subtree index of the reference destination entry of index variable v (S95).

In a case in which variable u≤input time q ("Yes" in S94), the interval tree search unit 42 sets to index variable v the left subtree index of the reference destination entry of index variable v (S96). Here, in a case in which time variable t>variable u ("Yes" in S97), the interval tree search unit 42 sets to time variable t the start time that is set to variable u (S98).

Processes in S93-98 will be repeated until the reference destination of index variable v is a leaf (NIL). In a case in which the reference destination of index variable v is a leaf (NIL) ("Yes" in S92), the interval tree search unit 42 returns time variable t to the reception and reply unit 41.

Figure 22:
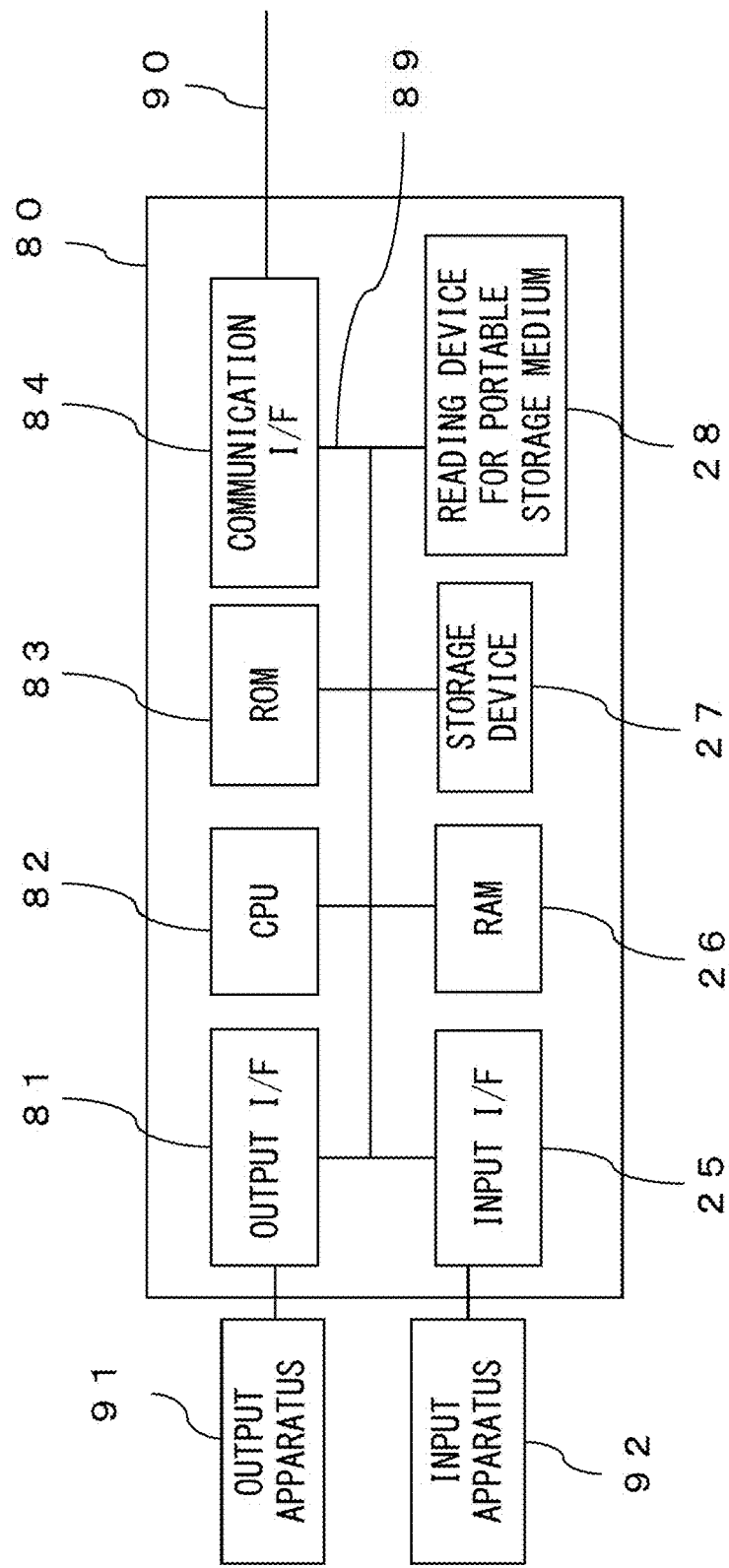
FIG. 22 is a hardware environment configuration block diagram of a computer that executes a program according to the embodiment.

FIG. 22 is a hardware environment configuration block diagram of a computer that executes a program according to the embodiment. A computer 80 is used as the load balancer 12, the storage proxy 13, the metadata server 15, the storage node 16, the client 10, and the reproduction client 50. The computer 80 is configured of a CPU 82, a ROM 83, a RAM 86, a communication I/F 84, a storage device 87, an output I/F 81, an input I/F 85, a reading device 88, a bus 89, an output apparatus 91, and an input apparatus 92.

Here, CPU indicates a central processing unit. ROM indicates a read-only memory. RAM indicates a random access memory. I/F indicates an interface. The CPU 82, the ROM 83, the RAM 86, the communication I/F 84, the storage device 87, the output I/F 81, the input I/F 85, and the reading device 88 are connected to the bus 89. The reading device 88 is a device for reading from a portable recording medium. The output apparatus 91 is connected to the output I/F 81. The input apparatus 92 is connected to the input I/F 85.

As the storage device 87, various types of storage devices may be used, such as a hard disk, a flash memory, and a magnetic disk. In the storage device 87 or the ROM 83, a program etc. according to the embodiment is stored. In the case of storage proxy 13, an example of the storage device 87 is the internal buffer memory area 14. In the case of metadata server 15, for example, the interval management table 44 is stored in the storage device 87 or the ROM 83. In the case of storage node 16, for example, an area for storing an event block is provided in the storage device 87. In the case of the reproduction client 50, for example, the merge tree storage area 53 is provided in the storage device 87.

The CPU 82 reads out a program that is stored in the storage device 87 etc. and that realizes the processes that have been described in the above embodiment, and executes the program.

The program for realizing the processes that have been described in the above embodiment may be provided from a program provider side via a communication network 90 and the communication I/F 84 and may be stored, for example, in the storage device 87. In addition, the program for realizing the processes that have been described in the above embodiment may be stored in a commercially available portable storage medium. In this case, the portable storage medium may be set in the reading device 88, and the program may be readout and executed by the CPU 82. As the portable storage medium, various types of storage media may be used such as a CD-ROM, a flexible disk, an optical disk, a magneto-optical disk, an IC card, a USB memory, etc. The program that is stored in such a storage medium is read by the reading device 88.

As the input apparatus 92, it is possible to use a keyboard, a mouse, an electronic camera, a web camera, a microphone, a scanner, a sensor, a tablet, etc. As the output apparatus 91, it is possible to use a display, a printer, a speaker, etc. The network 90 may be a communication network such as the Internet, a LAN, a WAN, a leased line, a cable, radio, etc.

According to the embodiment, it is possible to accumulate and reproduce at a high speed stream data of a large and variable flow rate. First, as will be described below, it is possible to accumulate at a highspeed stream data of a large and variable flow rate. A stream is distributed by means of the load balancer 12 to a plurality of storage proxies 13. Therefore, it is possible for the load balancer 12 to deal with stream data up to the performance limit of the network. Therefore, when enough storage nodes are prepared, it is possible to accumulate stream data up to the network performance limit of the load balancer.

In addition, the storage proxy 13 packs event data into a lump called an event block. Thus, it is possible to perform writing to a storage at a size that is capable of achieving the greatest throughput of the storage. In addition, since it is possible to perform writing to the storage in parallel by using the plurality of storage proxies 13, it is possible to obtain a writing performance that is proportional to the number of storage nodes 16. That is, it is possible to change the number of storage proxies and the number of storage nodes according to the flow rate of a stream.

In addition, it is possible to cope with dynamic expansion and contraction of the number of storage nodes 16 by managing by means of the metadata server 15 where in the storage the event block in which data is compressed exists. Management targets of the metadata server 15 are event block names and interval information.

Next, the technical advantages of high-speed reproduction are as follows. The reproduction client 50 may reconstruct the original stream from data that is divided into event blocks. By obtaining via the load balancer 12 event blocks that are preferable for reproduction, it is possible to effectively use network resources.

In addition, when a time (or an event serial number) is designated, it is possible to reproduce the stream from the time (or the event serial number) in the following manner. Specifically, when a time is designated, it is possible to obtain the minimum set of event blocks that have the possibility of including data at that time.

In addition, it is possible to appropriately control the system resource amount that is preferable for reproduction and to perform a reproduction process under realistic system resources. When the reproduction time period is long, the reproduction client 50 does not collectively read out event blocks that are within a reproduction time range. The reproduction client 50 reads out event blocks for a $\Delta$ time period from the reproduction start time, and creates a merge tree that retains at least data for a $\Delta$ time period. The reproduction client 50 reconstructs a partial stream from the merge tree and reproduces the partial stream. The next time is not set to the previous reproduction time+$\Delta$ time period. The "next start time" is determined according to the interval tree. Thus, even in a case in which $\Delta$ is short, it is possible to reconstruct the next partial stream without lowering efficiency. As described, the embodiment is novel and advantageous in that it is possible to perform an incremental process and there are no wasteful system resources.

By using the merge tree of the embodiment, the reproduction client 50 does not read out the event block that is being read out from the storage node 16 until readout has been completed, and reads out one by one event blocks that have already been read out. It is possible to achieve a high-speed performance, because, as described, the readout process that uses the merge tree is a parallel process, and units of the process are read out of data from a node, which has a very fine granularity. Therefore, reproduction of stream data is sped up due to parallel reading out of storage nodes.

According to an aspect of the embodiment, it is possible to speed up reading out of data in a time series that is stored in the storage unit.

Note that the present invention is not limited to the embodiment that has been described above, and may take various configurations or embodiments within a scope not deviating from the gist of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage system comprising:
    a data storage device that stores data segments which represents data obtained by dividing a time-series data;
    a terminal device that transmits a search request including a predetermined start request time; and
    a server device that includes:
        a communication interface that connects to a communication network so as to communicate with the terminal device;
        an interval-related information storage device that stores pieces of interval-related information each of which associates a piece of identifying information identifying one of the data segments with a start time and an end time of the one of the data segments; and
        a processor that performs a process including:
            controlling the communication interface to receive the search request from the terminal device;
            acquiring the predetermined start request time from the search request;
            searching the interval-related information storage device for specific data segments, the specific data segments being included in the data segments, a time interval between the start time and the end time of each of the specific data segments overlapping a specific time interval between the predetermined start request time and a specific time that is a predetermined duration of time after the predetermined start request time;
            acquiring pieces of the identifying information of the specific data segments from the interval-related information storage device; and
            controlling the communication interface to transmit a response to the search request to the terminal device, the response including the acquired identifying information,
    the terminal device
        receives the response from the server device,
        acquires from the data storage device the data segments corresponding to the acquired identifying information included in the response, and
        reads out the acquired data segments in chronological order;
    wherein the response further includes a next start time, the next start time being an earliest start time among the start times of following data segments, the following data segments being included in the data segments, a time interval between the start time and the end time of each of the following data segments not overlapping the specific time interval, the time interval of each of the following data segments coming after the specific time,
    the terminal device transmits a next search request including the next start time when the next start time precedes a predetermined end request time,
    the process further includes controlling the communication interface to receive the next search request from the terminal device, and
    when the next search request is received, the searching is further performed by using, as a substitute for the predetermined start request time, the next start time included in the next search request.

2. The storage system according to claim 1, wherein when the acquired data segments have been acquired from the data storage device, the terminal device reads out one of the acquired data segments the start time of which is an earliest start time among the acquired data segments.

3. The storage system according to claim 1, further comprising a sorting device that sorts the time-series data by using a load balancing algorithm.

4. A non-transitory computer-readable recording medium having stored therein a control program for causing a computer to execute a process, the process comprising:
    controlling a communication interface to receive a search request including a predetermined start request time from a terminal device that transmits the search request, the communication interface being an interface that connects to a communication network so as to communicate with the terminal device;
    acquiring the predetermined start request time from the search request;
    searching interval-related information storage device for specific data segments, the interval-related information storage device being a storage that stores pieces of interval-related information each of which associates a piece of identifying information identifying one of data segments with a start time and an end time of the one of data segments, the data segments being stored in a data storage device and representing data obtained by dividing a time-series data, the specific data segments being included in the data segments, a time interval between the start time and the end time of each of the specific data segments overlapping a specific time interval between the predetermined start request time and a specific time that is a predetermined duration of time after the predetermined start request time;
    acquiring pieces of the identifying information of the specific data segments from the interval-related information storage device; and
    controlling the communication interface to transmit a response to the search request to the terminal device, the response including the acquired identifying information;
    wherein the response further includes a next start time, the next start time being an earliest start time among the start times of following data segments, the following data segments being included in the data segments, a time interval between the start time and the end time of each of the following data segments not overlapping the specific time interval, the time interval of each of the following data segments coming after the specific time,
    a next search request including the next start time is transmitted from the terminal device when the next start time precedes a predetermined end request time,
    the process further includes controlling the communication interface to receive the next search request from the terminal device, and
    when the next search request is received, the searching is further performed by using, as a substitute for the predetermined start request time, the next start time included in the next search request.

5. A control method for a storage system including a data storage device, a server device, and a terminal device, the control method comprising:
    using the terminal device, transmitting a search request including a predetermined start request time;

using the server device, controlling a communication interface to receive the search request from the terminal device, the communication interface being an interface that connects to a communication network so as to communicate with the terminal device;

using the server device, acquiring the predetermined start request time from the search request;

using the server device, searching interval-related information storage device for specific data segments, the interval-related information storage device being a storage that stores pieces of interval-related information each of which associates a piece of identifying information identifying one of data segments with a start time and an end time of the one of data segments, the data segments being stored in the data storage device and representing data obtained by dividing a time-series data, the specific data segments being included in the data segments, a time interval between the start time and the end time of each of the specific data segments overlapping a specific time interval between the predetermined start request time and a specific time that is a specified predetermined duration of time, after the predetermined start request time;

using the server device, acquiring pieces of the identifying information of the specific data segments from the interval-related information storage device;

using the server device, controlling the communication interface to transmit a response to the search request to the terminal device, the response including the acquired identifying information;

using the terminal device, receiving the response from the server device;

using the terminal device, acquiring from the data storage device the data segments corresponding to the acquired identifying information included in the response; and using the terminal device, reading the acquired data segments in chronological order, wherein the response further includes a next start time, the next start time being an earliest start time among the start times of following data segments, the following data segments being included in the data segments, a time interval between the start time and the end time of each of the following data segments not overlapping the specific time interval, the time interval of each of the following data segments coming after the specific time, the terminal device transmits a next search request including the next start time when the next start time precedes a predetermined end request time, the process further includes controlling the communication interface to receive the next search request from the terminal device, and when the next search request is received, the searching is further performed by using, as a substitute for the predetermined start request time, the next start time included in the next search request.

6. The control method for the storage system according to claim 5, wherein when the acquired data segments have been acquired from the data storage device, the terminal device reads one of the acquired data segments the start time of which is an earliest start time among the acquired data segments.

7. The control method for the storage system according to claim 5, the control method further comprising using a sorting unit that is included in the storage device, sorting the time-series data by using a load balancing algorithm.

\* \* \* \* \*